US012574349B2

(12) United States Patent
Shin et al.

(10) Patent No.: US 12,574,349 B2
(45) Date of Patent: Mar. 10, 2026

(54) ELECTRONIC APPARATUS AND CONTROL METHOD

(71) Applicant: SAMSUNG ELECTRONICS CO., LTD., Suwon-si (KR)

(72) Inventors: Kiock Shin, Suwon-si (KR); Changhun Kim, Suwon-si (KR); Sarfaraz Ahmed, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/637,158

(22) Filed: Apr. 16, 2024

(65) Prior Publication Data

US 2024/0275762 A1 Aug. 15, 2024

Related U.S. Application Data

(63) Continuation of application No. PCT/KR2022/017255, filed on Nov. 4, 2022.

(30) Foreign Application Priority Data

Dec. 27, 2021 (KR) ........................ 10-2021-0188759

(51) Int. Cl.
*H04L 61/5038* (2022.01)
*H04L 12/40* (2006.01)
*H04L 101/604* (2022.01)

(52) U.S. Cl.
CPC .......... *H04L 61/5038* (2022.05); *H04L 12/40* (2013.01); *H04L 2101/604* (2022.05)

(58) Field of Classification Search
None
See application file for complete search history.

(56) References Cited

U.S. PATENT DOCUMENTS 4,320,388 A * 3/1982 McCarthy ......... H04L 12/40169
                                                      398/118
5,860,136 A * 1/1999 Fenner .................. H04W 40/02
                                                      711/201

(Continued)

FOREIGN PATENT DOCUMENTS

DE        100 38 783 A1      3/2001
EP        2 545 751 B1       9/2016

(Continued)

OTHER PUBLICATIONS

International Search Report and Written Opinion (PCT/ISA/210 and PCT/ISA/237) dated Feb. 15, 2023, issued by International Searching Authority for International Application No. PCT/KR2022/017255.

(Continued)

*Primary Examiner* — Phyllis A Book
(74) *Attorney, Agent, or Firm* — Sughrue Mion, PLLC

(57) ABSTRACT

An electronic device including: a memory configured to store an address code; a communication interface configured to communicate with one or more node apparatuses among a plurality of node apparatuses by serial communication; and a processor configured to: obtain the address code and an address value corresponding to one node apparatus among the one or more node apparatuses, generate an Ethernet frame including a custom field based on the address code and the address value, and transmit the generated Ethernet frame to the one node apparatus through the communication interface, where the custom field includes: an address code area storing the address code and an address value area storing the address value, and the address code configured to set the address value of the one node apparatus.

12 Claims, 26 Drawing Sheets

(56)        References Cited

U.S. PATENT DOCUMENTS

| | | | | |
|---|---|---|---|---|
| 5,920,253 | A * | 7/1999 | Laine ................ | H04L 12/40032 |
| | | | | 375/259 |
| 7,305,551 | B2 | 12/2007 | Kim et al. | |
| 8,674,628 | B2 | 3/2014 | Kim et al. | |
| 8,799,741 | B2 | 8/2014 | Jeong et al. | |
| 9,252,969 | B2 | 2/2016 | Rohatschek et al. | |
| 10,185,689 | B2 | 1/2019 | Van Der Zande et al. | |
| 11,917,038 | B2 * | 2/2024 | Nolan ................... | H04L 41/142 |
| 2002/0010793 | A1 * | 1/2002 | Noll ........................ | H04L 69/12 |
| | | | | 709/240 |
| 2011/0265129 | A1 | 10/2011 | Na et al. | |
| 2012/0109995 | A1 * | 5/2012 | Hays .................. | G06F 16/2448 |
| | | | | 707/E17.069 |
| 2013/0021945 | A1 * | 1/2013 | Yura ....................... | H04L 45/22 |
| | | | | 370/254 |
| 2023/0309173 | A1 | 9/2023 | Kim | |
| 2024/0373484 | A1 * | 11/2024 | Yang ....................... | H04W 4/06 |

FOREIGN PATENT DOCUMENTS

| | | | | | |
|---|---|---|---|---|---|
| EP | 2 663 029 | B1 | 9/2017 | | |
| JP | 6-97948 | A | 4/1994 | | |
| JP | 2603158 | B2 | 1/1997 | | |
| JP | 4122574 | B2 | 7/2008 | | |
| JP | 5212509 | B2 | 6/2013 | | |
| JP | 2013-529006 | A | 7/2013 | | |
| JP | 6198967 | B2 | 9/2017 | | |
| KR | 101208230 | B1 * | 5/2009 | ............. | H04L 45/18 |
| KR | 10-0933167 | B1 | 12/2009 | | |
| KR | 10-2011-0131470 | A | 12/2011 | | |
| KR | 10-2012-0031910 | A | 4/2012 | | |
| KR | 10-2012-0108737 | A | 10/2012 | | |
| KR | 10-1203471 | B1 | 11/2012 | | |
| KR | 10-2020-0049444 | A | 5/2020 | | |

OTHER PUBLICATIONS

Communication dated Jan. 24, 2025, issued by the European Patent Office in European Patent Application 22916383.7.

* cited by examiner

FIG. 3
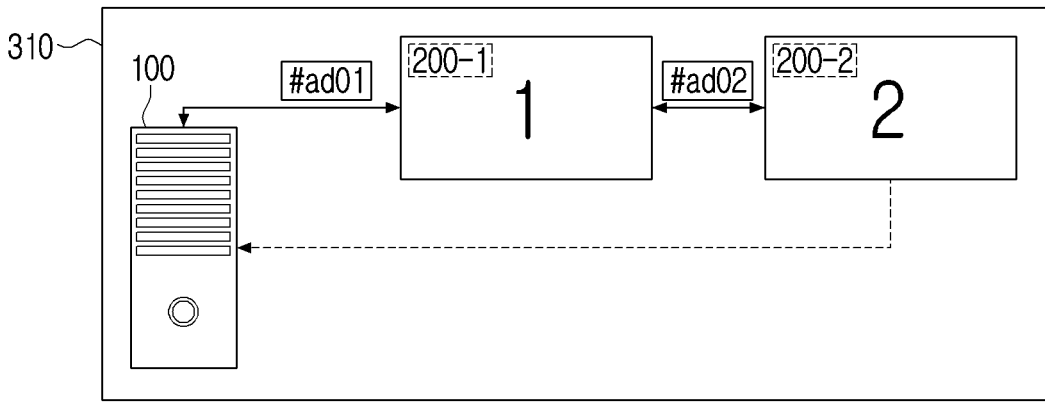
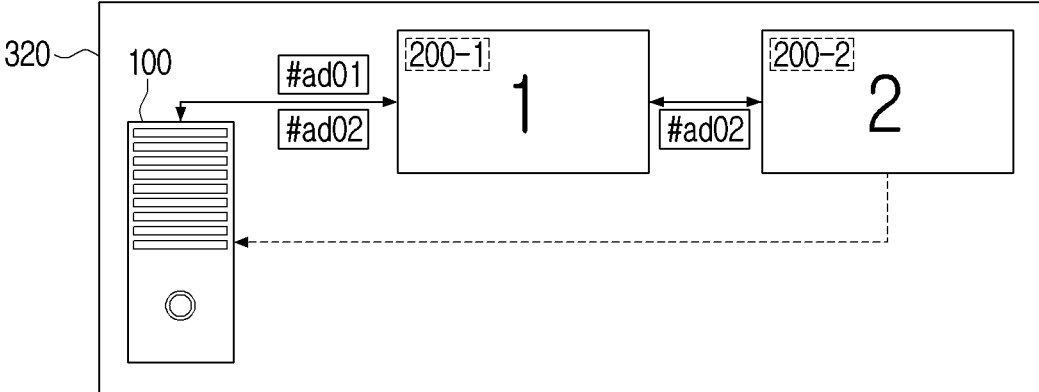
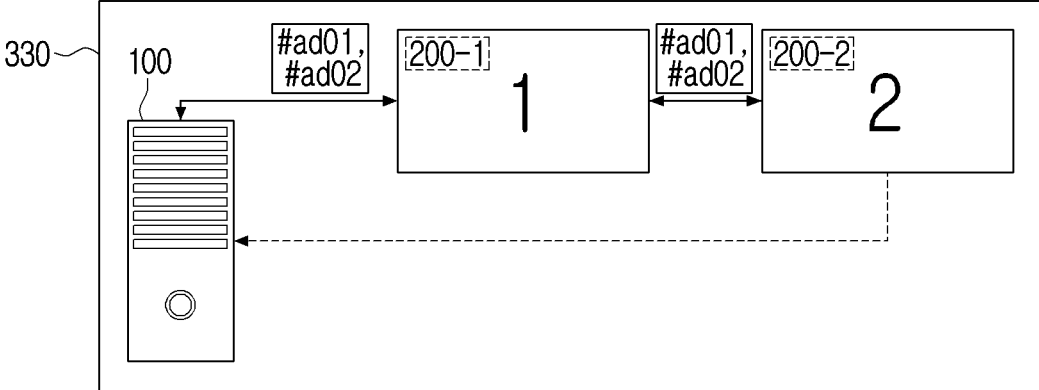

FIG. 7
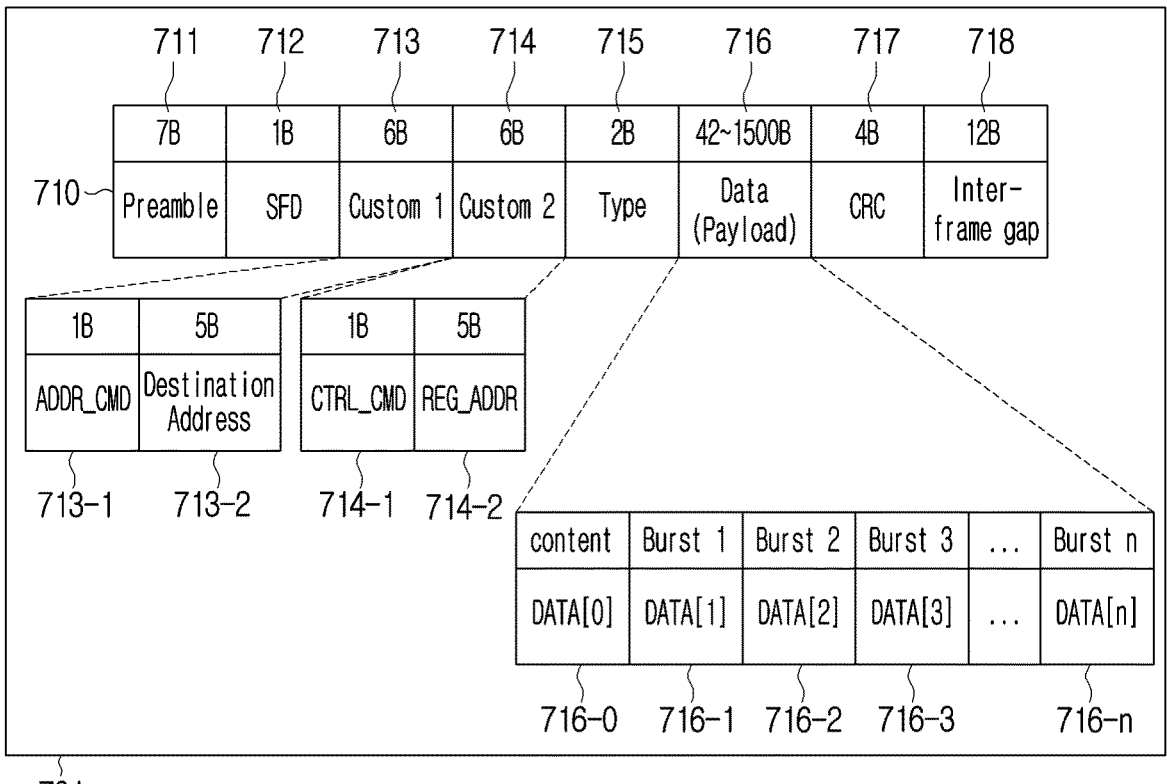
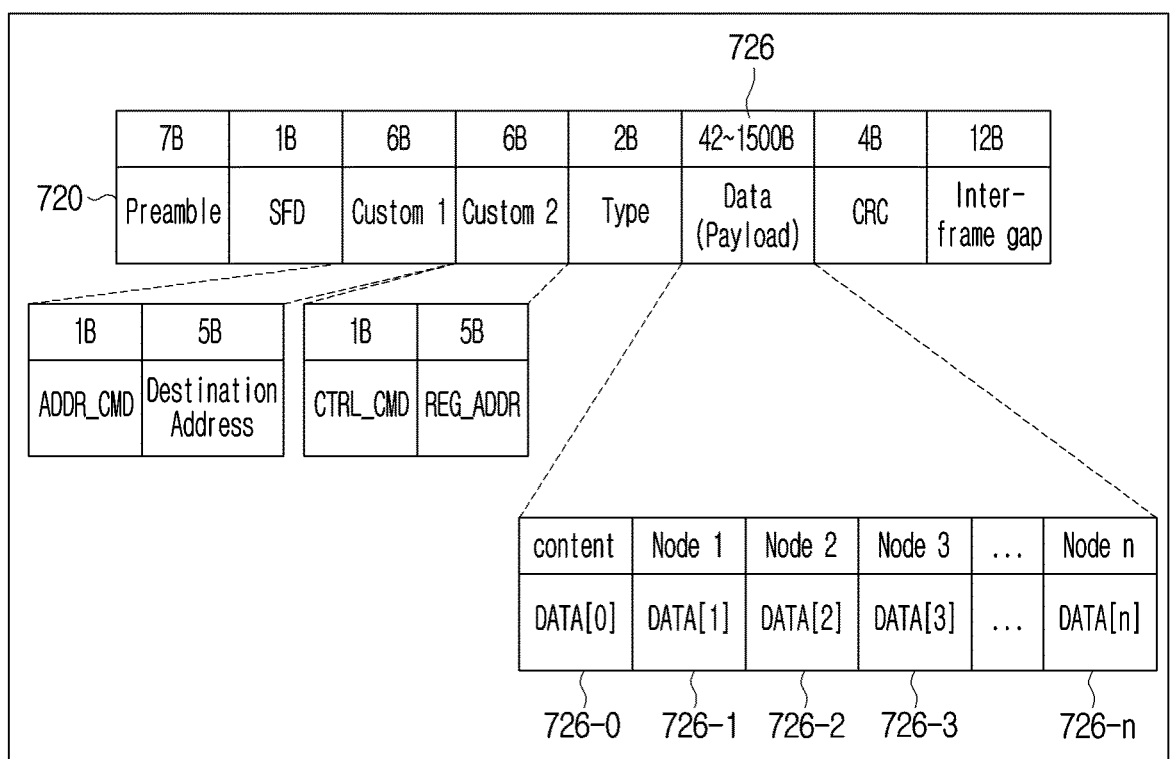

| CTRL_CMD | description |
|----------|-------------|
| 0000_0000 | IDLE |
| 0000_0001 | ONE Node WR |
| 0000_0010 | ONE Node RD |
| 0000_0011 | ONE Node Burst WR |
| 0000_0100 | ONE Node Burst RD |
| 1000_0001 | Multi-node WR |
| 1000_0010 | Multi-node RD |

FIG. 13

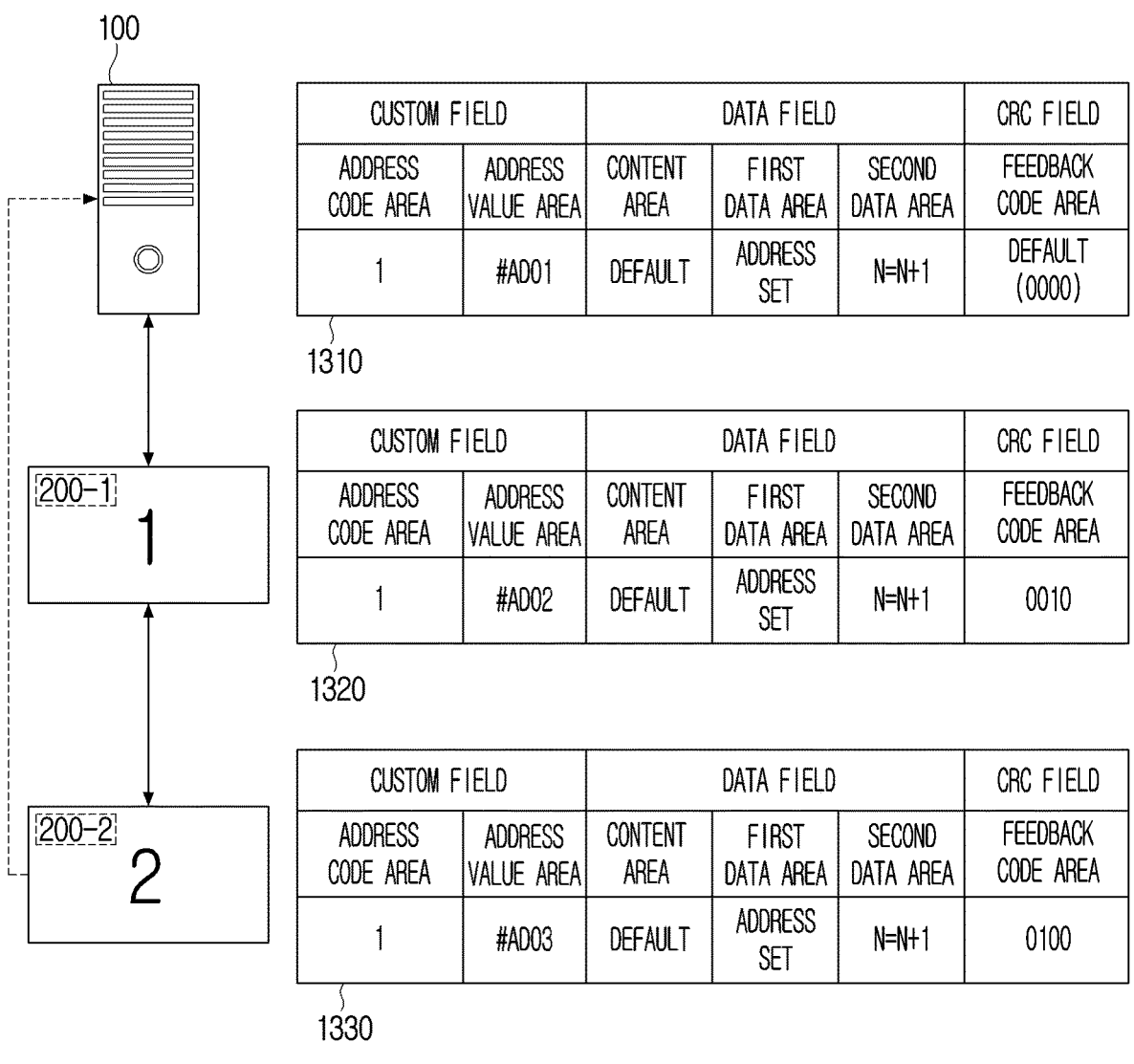

100

200-1
1

200-2
2

| CUSTOM FIELD | | DATA FIELD | | | CRC FIELD |
|---|---|---|---|---|---|
| ADDRESS CODE AREA | ADDRESS VALUE AREA | CONTENT AREA | FIRST DATA AREA | SECOND DATA AREA | FEEDBACK CODE AREA |
| 1 | #AD01 | DEFAULT | ADDRESS SET | N=N+1 | DEFAULT (0000) |

1310

| CUSTOM FIELD | | DATA FIELD | | | CRC FIELD |
|---|---|---|---|---|---|
| ADDRESS CODE AREA | ADDRESS VALUE AREA | CONTENT AREA | FIRST DATA AREA | SECOND DATA AREA | FEEDBACK CODE AREA |
| 1 | #AD02 | DEFAULT | ADDRESS SET | N=N+1 | 0010 |

1320

| CUSTOM FIELD | | DATA FIELD | | | CRC FIELD |
|---|---|---|---|---|---|
| ADDRESS CODE AREA | ADDRESS VALUE AREA | CONTENT AREA | FIRST DATA AREA | SECOND DATA AREA | FEEDBACK CODE AREA |
| 1 | #AD03 | DEFAULT | ADDRESS SET | N=N+1 | 0100 |

1330

1

ELECTRONIC APPARATUS AND CONTROL METHOD

CROSS-REFERENCE TO RELATED APPLICATION

This application is a bypass continuation of International Application No. PCT/KR2022/017255 filed on Nov. 4, 2022, in the Korean Intellectual Property Receiving Office, which is based on and claims priority to Korean Patent Application No. 10-2021-0188759, filed on Dec. 27, 2021, in the Korean Intellectual Property Office, the disclosure of which are incorporated by reference herein in their entireties.

BACKGROUND

1. Field

The disclosure relates to an electronic apparatus and a control method therefor, and more particularly, to an electronic apparatus that sets address information of a plurality of node apparatuses connected by serial communication, and a control method therefor.

2. Description of Related Art

An Ethernet may be used as an interface for data communication. A communication system using an Ethernet may include a master apparatus and a plurality of node apparatuses. An Ethernet is a near field communication network by a bus structure method, and is a computer network technology for transmitting data to a plurality of node apparatuses.

In case a plurality of node apparatuses exist in a location that is difficult for a user to access such as a wall surface of a building or a ceiling of a stadium, it may be difficult for the user to directly set the addresses.

Accordingly, there is a need for a master apparatus that directly controls setting of addresses for a plurality of node apparatuses. If the master apparatus performs 1:1 communication with each node apparatus for communicating with the plurality of node apparatuses, there may be a problem because the number of communications will increase according to the number of the node apparatuses. For example, n number of communications may be needed for the master apparatus to perform communications with n node apparatuses. In case n communications are performed, there may be a problem based on the length of time to transmit data.

SUMMARY

Provided is an electronic apparatus that performs setting of addresses of a plurality of node apparatuses by transmitting an Ethernet frame including address codes related to setting of address values of the node apparatuses and the address values, and a control method therefor.

According to an aspect of an embodiment, an electronic device may include: a memory configured to store an address code; a communication interface configured to communicate with one or more node apparatuses among a plurality of node apparatuses by serial communication; and a processor configured to: obtain the address code and an address value corresponding to one node apparatus among the one or more node apparatuses, generate an Ethernet frame including a custom field based on the address code and the address value, and transmit the generated Ethernet frame to the one node apparatus through the communication interface, where the custom field includes: an address code area storing the address code and an address value area storing the address value, and the address code configured to set the address value of the one node apparatus.

The address code may include a first binary code of a first value or a second binary code of a second value, where the first value is configured to initialize a predetermined address value in the one node apparatus, and where the second value is configured to set the address value of the one node apparatus based on the address value stored in the custom field.

The processor may be further configured to: based on obtaining a user instruction for setting address values of the plurality of node apparatuses, obtain the first binary code, store the first binary code in the address code area of the custom field, and generate the Ethernet frame based on the custom field.

The processor may be further configured to: based on the address values of the plurality of node apparatuses being initialized, obtain the second binary code and a first address value, store the second binary code in the address code area of the custom field, store the first address value in the address value area of the custom field, and generate the Ethernet frame based on the custom field.

The address value may be updated based on respective address values corresponding to each of the plurality of node apparatuses.

The respective address values may be updated in each of the plurality of node apparatuses.

The one or more node apparatuses may include a first node apparatus and a second node apparatus, where the processor is further configured to: transmit the Ethernet frame to the first node apparatus through the communication interface, and based on receiving a feedback frame from the second node apparatus, identify an integrity of a performed user instruction based on the feedback frame.

The feedback frame may be a second feedback frame, where the second feedback frame is generated in the second node apparatus based on a first feedback frame generated in the first node apparatus, where the first feedback frame is based on an operation performed in the first node apparatus based on the Ethernet frame, and where the second feedback frame is based on an operation performed in the second node apparatus that received the first feedback frame from the first node apparatus.

The processor may be further configured to: obtain reference code information corresponding to the user instruction, based on receiving the feedback frame through the communication interface, obtain feedback code information included in the feedback frame, and identify the integrity of the performed user instruction based on the feedback code information and reference code information.

The processor may be further configured to: based on whether the feedback code information and the reference code information coincide, obtain address values corresponding to each of the plurality of node apparatuses, store one address value among the address values corresponding to each of the plurality of node apparatuses in the address value area of the custom field, regenerate the Ethernet frame based on the custom field, and retransmit the regenerated Ethernet frame to the first node apparatus through the communication interface.

According to an aspect of an embodiment, a control method for an electronic apparatus that stores an address code, and communicates with one or more node apparatuses among a plurality of node apparatuses by serial communication, the control method may include: obtaining an address code and an address value corresponding to one node apparatus among the one or more node apparatuses; generating an Ethernet frame including a custom field based on the address code and the address value; and transmitting the generated Ethernet frame to the one node apparatus, where the custom field includes: an address code area storing the address code and an address value area storing the address value, and where the address code is configured to set the address value of the one node apparatus.

The address code may further include a first binary code of a first value or a second binary code of a second value, where the first value is configured to initialize a predetermined address value in the one node apparatus, and where the second value is configured to set the address value of the one node apparatus as the address value stored in the custom field.

The obtaining the address code and the address value may include, based on obtaining a user instruction for setting address values of the plurality of node apparatuses, obtaining the first binary code based on the user instruction, where the generating the Ethernet frame includes: storing the first binary code in the address code area of the custom field, and generating the Ethernet frame based on the custom field.

The obtaining the address code and the address value may include, based on the address values of the plurality of node apparatuses being initialized, obtaining the second binary code and a first address value, where the generating the Ethernet frame includes: storing the second binary code in the address code area of the custom field, storing the first address value in the address value area of the custom field, and generating the Ethernet frame based on the custom field.

The address value may be updated based on respective address values corresponding to each of the plurality of node apparatuses.

BRIEF DESCRIPTION OF DRAWINGS

The above and other aspects, features, and advantages of certain embodiments of the present disclosure will be more apparent from the following description taken in conjunction with the accompanying drawings, in which:

FIG. 3 is a diagram for illustrating a method of setting addresses of a plurality of node apparatuses according to a plurality of embodiments;

FIG. 7 is a diagram for illustrating an Ethernet frame according to one or more embodiments;

FIG. 8 is a table for illustrating control code information according to an embodiment;

FIG. 13 is a diagram for illustrating an operation of setting address values according to an embodiment;

DETAILED DESCRIPTION

Figure 1:
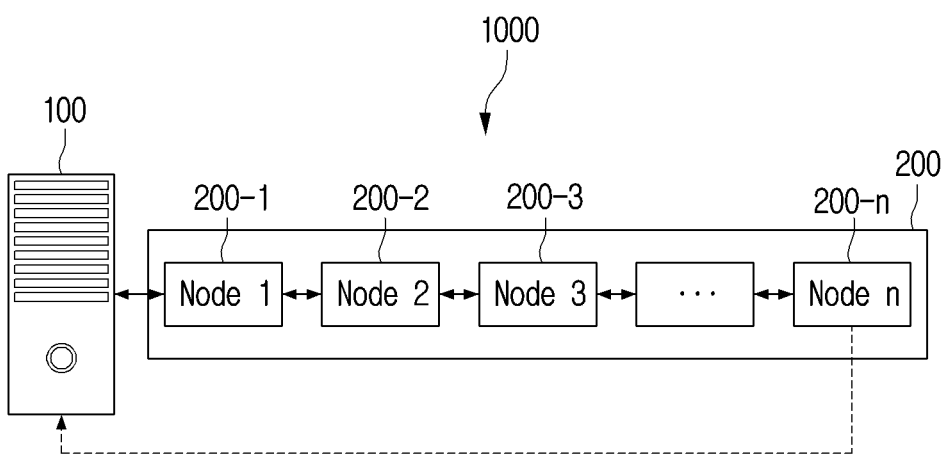
FIG. 1 is a diagram for illustrating a system including an electronic apparatus and a plurality of node apparatuses according to an embodiment.

Hereinafter, example embodiments of the disclosure will be described in detail with reference to the accompanying drawings. The same reference numerals are used for the same components in the drawings, and redundant descriptions thereof will be omitted. The embodiments described herein are example embodiments, and thus, the disclosure is not limited thereto and may be realized in various other forms. It is to be understood that singular forms include plural referents unless the context clearly dictates otherwise.

The terms including technical or scientific terms used in the disclosure may have the same meanings as generally understood by those skilled in the art. However, the terms may vary depending on the intention of those skilled in the art who work in the pertinent field, previous court decisions, or emergence of new technologies, etc. Also, in particular cases, there may be terms that were designated by the applicant on his own, and in such cases, the meaning of the terms will be described in detail in the relevant descriptions in the disclosure. Accordingly, the terms used in the disclosure should be defined based on the meaning of the terms and the overall content of the disclosure, and are not limited based on the names of the terms.

Also, in this specification, expressions such as "have," "may have," "include," "may include," "consist of," and "may consist of" should be construed as denoting that there are such characteristics, numbers, steps, operations, elements, components, or a combination thereof described in the specification, but not as excluding in advance the existence or possibility of adding one or more of other characteristics, numbers, steps, operations, elements, components, or a combination thereof.

In addition, the expression "at least one of A or B" should be interpreted to mean any one of "A" or "B" or "A and B."

Further, the expressions "first," "second," and the like used in this specification may describe various elements regardless of any order or degree of importance. In addition, such expressions are used only to distinguish one element from another element, and are not intended to limit the elements.

Also, the description in the disclosure that one element (e.g.: a first element) is "(operatively or communicatively) coupled with/to" or "connected to" another element (e.g.: a second element) should be interpreted to include both the case where the one element is directly coupled to the another element, and the case where the one element is coupled to the another element through still another element (e.g.: a third element).

Further, in the disclosure, "a module" or "a part" may perform at least one function or operation, and may be implemented as hardware or software, or as a combination of hardware and software. Further, a plurality of "modules" or "parts" may be integrated into at least one module and implemented as at least one processor (not shown), excluding "a module" or "a part" that needs to be implemented as specific hardware.

Also, in this specification, the term "user" may refer to a person who uses an electronic apparatus or an apparatus using an electronic apparatus (e.g.: an artificial intelligence electronic apparatus).

Hereinafter, an embodiment of the disclosure will be described in more detail with reference to the accompanying drawings.

FIG. 1 is a diagram for illustrating a system 1000 including an electronic apparatus 100 and a node network 200.

Referring to FIG. 1, the system 1000 may include an electronic apparatus 100 and a node network 200. The system 1000 may be a system implemented with serial communication or serial transmission. The electronic apparatus 100 and the node network 200 may perform communication by a serial communication method or a serial transmission method. Serial communication or serial transmission may mean a method wherein all of a plurality of apparatuses are connected serially through a main communication circuit.

The electronic apparatus 100 may mean a management apparatus for controlling the node network 200. The electronic apparatus 100 may be a master apparatus or a host apparatus.

The node network 200 may mean a network including a plurality of node apparatuses 200-1-200-$n$ controlled by the electronic apparatus 100. The plurality of node apparatuses 200-1-200-$n$ may be client apparatuses or sub apparatuses. The plurality of node apparatuses 200-1-200-$n$ may mean one or more node apparatuses. For example, the node network 200 may include a first node apparatus 200-1, a second node apparatus 200-2, a third node apparatus 200-3 to nth node apparatus 200-$n$.

For example, the electronic apparatus 100 may transmit data to the first node apparatus 200-1 in the node network 200, and the first node apparatus 200-1 may transmit the data received from the electronic apparatus 100 to the second node apparatus 200-2. Then, the second node apparatus 200-2 may transmit the data received from the first node apparatus 200-1 to the third node apparatus 200-3. Meanwhile, the nth node apparatus 200-$n$ may transmit again the data received from the previous node apparatus to the electronic apparatus 100.

The nth node apparatus 200-$n$ may transmit the data again to a reverse direction (or a reverse route) of the route wherein the received data was transmitted. The nth node apparatus 200-$n$ may ultimately transmit the received data to the electronic apparatus 100 through a reverse route.

Figure 2:
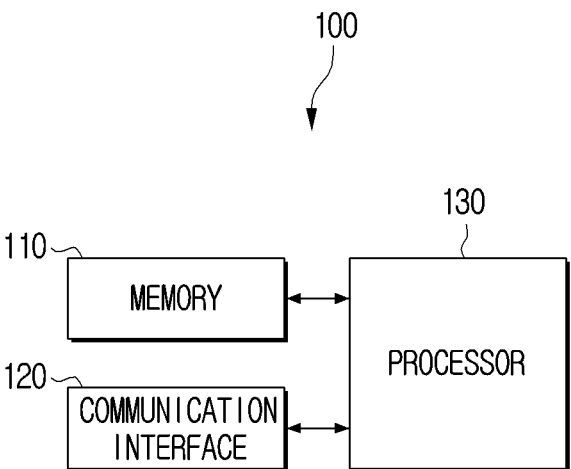
FIG. 2 is a block diagram illustrating an electronic apparatus according to an embodiment of the disclosure.

FIG. 2 is a block diagram illustrating the electronic apparatus 100 according to an embodiment of the disclosure.

Referring to FIG. 2, the electronic apparatus 100 may include a memory 110, a communication interface 120, and a processor 130.

The electronic apparatus 100 according to one or more embodiments may include, for example, at least one of a smartphone, a tablet PC, a mobile phone, a desktop PC, a laptop PC, a PDA, or a portable multimedia player (PMP). In some embodiments, the electronic apparatus 100 may include, for example, at least one of a television, a digital video disk (DVD) player, or a media box (e.g.: Samsung HomeSync™, Apple TV™, or Google TV™).

The memory 110 may be implemented as an internal memory such as a ROM (e.g., an electrically erasable programmable read-only memory (EEPROM)), a RAM, etc., included in the processor 130, or implemented as a separate memory from the processor 130. In this case, the memory 110 may be implemented in the form of a memory embedded in the electronic apparatus 100, or implemented in the form of a memory that can be attached to or detached from the electronic apparatus 100 according to the use of stored data. For example, in the case of data for driving the electronic apparatus 100, the data may be stored in a memory embedded in the electronic apparatus 100, and in the case of data for an extended function of the electronic apparatus 100, the data may be stored in a memory that can be attached to or detached from the electronic apparatus 100.

In the case of a memory embedded in the electronic apparatus 100, the memory may be implemented as at least one of a volatile memory (e.g.: a dynamic RAM (DRAM), a static RAM (SRAM), or a synchronous dynamic RAM (SDRAM), etc.) or a non-volatile memory (e.g.: an one time programmable ROM (OTPROM), a programmable ROM (PROM), an erasable and programmable ROM (EPROM), an electrically erasable and programmable ROM (EEPROM), a mask ROM, a flash ROM, a flash memory (e.g.: NAND flash or NOR flash, etc.), a hard drive, or a solid state drive (SSD)). Also, in the case of a memory that can be attached to or detached from the electronic apparatus 100, the memory may be implemented in forms such as a memory card (e.g., compact flash (CF), secure digital (SD), micro secure digital (Micro-SD), mini secure digital (Mini-SD), extreme digital (xD), a multi-media card (MMC), etc.), an external memory that can be connected to a USB port (e.g., a USB memory), etc.

The communication interface 120 is a component that performs communication with various types of external apparatuses according to various types of communication methods. The communication interface 120 may include a wireless communication module or a wired communication module. Each communication module may be implemented in a form of at least one hardware chip.

A wireless communication module may be a module that communicates with an external apparatus wirelessly. For example, a wireless communication module may include at least one module among a Wi-Fi module, a Bluetooth® module, an infrared communication module, or other communication modules.

A wired communication module may be a module that communicates with an external apparatus via wire. For example, a wired communication module may include at least one of a local area network (LAN) module, an Ethernet module, a pair cable, a coaxial cable, an optical fiber cable, or an ultra wide-band (UWB) module.

In the following description, an embodiment wherein the communication interface 120 uses an Ethernet® module for communicating with the node network 200 will be described.

The processor 130 may perform an overall control operation of the electronic apparatus 100. The processor 130 performs a function of controlling the overall operations of the electronic apparatus 100.

The processor 130 may be implemented as a digital signal processor (DSP) processing digital signals, a microprocessor, and a time controller (TCON). However, the disclosure is not limited thereto, and the processor 130 may include one or more of a central processing unit (CPU), a micro controller unit (MCU), a micro processing unit (MPU), a controller, an application processor (AP), a graphics-processing unit (GPU) or a communication processor (CP), and an ARM processor, or may be defined by the terms. Also, the processor 130 may be implemented as a system on chip (SoC) having a processing algorithm stored therein or large scale integration (LSI), or in the form of a field programmable gate array (FPGA). In addition, the processor 130 may perform various functions by executing computer executable instructions stored in the memory 110.

The electronic apparatus 100 may include a memory 110 storing address codes and a communication interface 120 communicating with at least one node apparatus among the plurality of node apparatuses 200-1-200-*n* connected through serial communication.

The electronic apparatus 100 may perform serial communication with the node network 200. The node network 200 may include the plurality of node apparatuses 200-1-200-*n*. The plurality of node apparatuses 200-1-200-*n* may perform serial communication with one another. Explanation regarding use of serial communication will be described in FIG. 3 to FIG. 6, etc.

The processor 130 may obtain an address code and an address value corresponding to any one node apparatus among the one or more node apparatuses, generate an Ethernet frame including a custom field based on the address code and the address value, and transmit the generated Ethernet frame to the any one node apparatus (e.g., a first node apparatus 200-1) through the communication interface 120. The custom field included in the Ethernet frame may include an address code area storing the address code and an address value area including the address value, and the address code may be a control code related to setting of the address value of the any one node apparatus.

The processor 130 may set address information of each of the plurality of node apparatuses 200-1-200-*n* included in the node network 200. The address information may include address values of each of the plurality of node apparatuses 200-1-200-*n*.

The address code may be a code that distinguishes an operation related to the address information. The operation related to the address information may mean an operation of initializing the address information or an operation of setting the address information as a specific address value.

The address code may include a first binary code of a first value or a second binary code of a second value, and the first value may be a control value for initializing a predetermined address value in the any one node apparatus, and the second value may be a control value for setting the address value of the any one node apparatus as the address value stored in the custom field.

For example, the first binary code may be 0, and the second binary code may be 1.

The first binary code may be a code for initializing the address information, and the second binary code may be a code for setting the address information. The operation of setting the address information may be described as an expression of generating, changing, or updating the address information.

The Ethernet frame may mean a frame transmitted to the node network 200. The Ethernet frame may include a custom field. The custom field is a field defined by the user in the Ethernet frame, and it may mean a field wherein various kinds of information or data defined by the user is stored.

The custom field may include an address code area and an address value area. The address code area may be an area wherein an address code is stored, and the address value area may be an area wherein an address value is stored.

The address value may be a value dividing the plurality of node apparatuses 200-1-200-*n*. Setting of the address value is setting related to the address value, and it may be described as an operation of setting the address information.

The processor 130 may store the address code and the address value in the custom field. Then, the processor 130 may generate the Ethernet frame based on the custom field wherein the address code and the address value are stored.

The processor 130 may transmit the Ethernet frame including the address code and the address value to any one node apparatus (e.g., the first node apparatus 200-1) connected with the electronic apparatus 100.

If a user instruction for setting the address values of the plurality of node apparatuses 200-1-200-*n* is obtained, the processor 130 may obtain the first binary code based on the user instruction, store the first binary code in the address code area of the custom field, and generate the Ethernet frame based on the custom field.

The user instruction for setting the address values may be an instruction for setting the address information of the plurality of node apparatuses 200-1-200-*n*. For example, the user instruction may be an instruction for the user to initially set the address values of the plurality of node apparatuses 200-1-200-*n*, or an instruction for resetting the address values of the plurality of node apparatuses 200-1-200-*n*.

When a user instruction is received, the processor 130 may obtain the first binary code for initializing the address values or the address information of the plurality of node apparatuses 200-1-200-*n*. Then, the processor 130 may generate the Ethernet frame based on the custom field storing the first binary code. Explanation related to the Ethernet frame storing the first binary code will be described in FIG. 12, FIG. 14, and FIG. 16.

When the address values of the plurality of node apparatuses 200-1-200-*n* are initialized, the processor 130 may obtain the second binary code and the first address value, store the second binary code in the address code area of the custom field, store the first address value in the address value area of the custom field, and generate the Ethernet frame based on the custom field.

The processor 130 may use feedback code information for determining whether the address values were initialized. The feedback code information may be information included in a feedback frame. The processor 130 may receive the feedback frame from the node network 200. An operation for determining integrity of an initializing operation will be described in FIG. 21.

If it is determined that the initializing operation was completed normally, the processor 130 may obtain the second binary code, and obtain the first address value based on an address value generation function. The second binary code may be a code for setting an address value as address information of a node apparatus. Then, the processor 130 may store the second binary code in the address code area, and store the first address value in the address value area. Then, the processor 130 may generate the Ethernet frame including the second binary code and the first address value. Explanation regarding the Ethernet frame storing the second binary code and the first address value will be described in FIG. 13, FIG. 15, and FIG. 17.

The feedback frame may be the Ethernet frame. The feedback frame may be a frame updated from the received Ethernet frame. Accordingly, both of the first feedback frame and the second feedback frame may be Ethernet frames. As a feedback code is generated and the Ethernet frame is updated in each of the plurality of node apparatuses 200-1-200-n, the term 'feedback frame' is used.

The address value may be a value that is updated to an address value corresponding to each of the plurality of node apparatuses 200-1-200-n.

The address value is a value for dividing the plurality of node apparatuses 200-1-200-n, and it may be a different value for each of the plurality of node apparatuses 200-1-200-n. For example, the first node apparatus 200-1 may have a first address value, and the second node apparatus 200-2 may have a second address value. The first address value and the second address value may be different.

The address value may be a value that is updated in each of the plurality of node apparatuses 200-1-200-n.

According to the first embodiment 310, an address value may be generated or changed in each of the electronic apparatus 100 and the node network 200. Explanation in this regard will be described in FIG. 9, FIG. 12, and FIG. 13.

According to the second embodiment 320, an address value may be generated or changed in the electronic apparatus 100. Explanation in this regard will be described in FIG. 10, FIG. 14, and FIG. 15.

According to the third embodiment 330, an address value may be generated in the electronic apparatus 100, and the address value may be stored in a node area corresponding to each of the plurality of node apparatuses 200-1-200-n. Explanation in this regard will be described in FIG. 11, FIG. 16, and FIG. 17.

The one or more node apparatuses may include the first node apparatus 200-1 and the second node apparatus 200-2, and the processor 130 may transmit the Ethernet frame to the first node apparatus 200-1 through the communication interface 120, and when a feedback frame is received from the second node apparatus 200-2, identify integrity regarding a result of performing the user instruction based on the feedback frame (the second feedback frame in the following description).

The feedback frame may be the second feedback frame, and the second feedback frame may be generated in the second node apparatus 200-2 based on the first feedback frame generated in the first node apparatus 200-1, and the first feedback frame may be a feedback frame regarding an operation performed in the first node apparatus 200-1 based on the Ethernet frame, and the second feedback frame may be a feedback frame regarding an operation performed in the second node apparatus 200-2 that received the first feedback frame from the first node apparatus 200-1.

It is assumed that the node network 200 includes the first node apparatus 200-1 and the second node apparatus 200-2. Also, it is assumed that the apparatuses are serially connected in the order of the electronic apparatus 100, the first node apparatus 200-1, the second node apparatus 200-2, and the electronic apparatus 100 again. Detailed explanation regarding the serially connected structure of the first node apparatus 200-1 and the second node apparatus 200-2 will be described in FIG. 3.

The processor 130 may transmit the generated Ethernet frame to the first node apparatus 200-1.

The first node apparatus 200-1 may perform an operation based on the Ethernet frame received from the electronic apparatus 100. Then, the first node apparatus 200-1 may generate an updated Ethernet frame (the first feedback frame) based on the result of performing the operation. Then, the first node apparatus 200-1 may transmit the updated Ethernet frame (the first feedback frame) to the second node apparatus 200-2.

The second node apparatus 200-2 may perform an operation based on the Ethernet frame (the first feedback frame) received from the first node apparatus 200-1. Then, the second node apparatus 200-2 may generate an-updated Ethernet frame (the second feedback frame) based on the result of performing the operation. Then, the second node apparatus 200-2 may transmit the re-updated Ethernet frame (the second feedback frame) to the electronic apparatus 100.

The processor 130 may receive the Ethernet frame (the second feedback frame) from the second node apparatus 200-2. Then, the processor 130 may identify integrity regarding the result of the operation performed in the node network 200 based on the second feedback frame. The operation of identifying the integrity may mean an operation of identifying the presence or absence of error in all operations performed in the node network 200. All the operations performed in the node network 200 may mean the operations performed in the node apparatuses. The operations performed in the node network 200 may mean an operation of initializing the address information or an operation of setting the address information.

The operation of receiving a feedback frame through the first node apparatus 200-1 and the second node apparatus 200-2 will be described in FIG. 19.

The processor 130 may obtain reference code information corresponding to the user instruction, and when the feedback frame is received through the communication interface 120, the processor 130 may obtain feedback code information included in the feedback frame, and identify integrity regarding the result of performing the user instruction based on the obtained feedback code information and reference code information.

The reference code information may be code information generated by the electronic apparatus 100. Also, the feedback code information may be code information generated by the plurality of node apparatuses 200-1-200-n. The subjects generating the reference code information and the feedback code information may be different. However, the generating functions of the reference code information and the feedback code information may be identical. For example, the generating function may be a predetermined function, and the predetermined function may mean a function of which code is changed based on an operation result. For example, if a first operation is performed, the code value may become bigger as much as a first value, and if a second operation is performed, the code value may become bigger as much as a second value. The processor 130 may determine the changed amount of the code value, and determine whether the first operation was performed or the second operation was performed.

The processor 130 needs to determine whether one or more operations performed in the node network 200 were performed normally (or an error occurred). The processor 130 may determine whether the operations were performed normally (or an error occurred) based on the feedback frame transmitted from the node network 200.

The electronic apparatus 100 may store a predetermined function (a code value changing function) in the memory 110. Then, the processor 130 may generate reference code information corresponding to a user instruction based on the predetermined function stored in the memory 110.

The processor 130 may calculate reference code information by predicting operations to be performed in the node network 200. The operations performed in the node network 200 may mean an operation of initializing the address information or an operation of setting the address information.

Accordingly, the processor 130 may identify operations to be performed in the node network 200, and obtain code values that are calculated in case each operation is performed normally as the reference code information. Then, the processor 130 may store the obtained reference code information in the memory 110.

Then, the processor 130 may identify integrity regarding the result of the operations performed in the node network 200 based on the received feedback frame. Each of the plurality of node apparatuses 200-1-200-n included in the node network 200 may update the feedback code information based on the result of the operation that it performed. Then, the processor 130 may receive the feedback frame including the feedback code information that was ultimately updated from the node network 200 through the communication interface 120.

The processor 130 may compare the reference code information stored in the memory 110 and the feedback code information received from the node network 200. Then, the processor 130 may identify integrity regarding the result of performing the operations in the node network 200 based on the comparison result.

If the reference code information and the feedback code information coincide, the processor 130 may determine that operations were performed normally in the node network 200.

If the reference code information and the feedback code information do not coincide, the processor 130 may determine that operations were not performed normally in the node network 200. The processor 130 may determine in which node apparatus among the plurality of node apparatuses 200-1-200-n an error occurred, and for which operation an error occurred by analyzing the feedback code information.

If the reference code information and the feedback code information do not coincide, the processor 130 may perform a predetermined operation.

The predetermined operation according to an embodiment may be an operation of providing information indicating occurrence of an error to the user. If the reference code information and the feedback code information do not coincide, the processor 130 may provide error information including at least one of a node apparatus wherein an error occurred or a reason for occurrence of an error to the user.

The operation of providing the error information to the user may be outputting error information.

The predetermined operation according to another embodiment may be an operation of retransmitting a control instruction. The processor 130 may retransmit the control instruction wherein an error occurred to the node network 200 again.

The feedback code information may be code information that was generated as each of the plurality of node apparatuses 200-1-200-n updated the feedback code information received from an adjacent node apparatus through serial communication.

If the obtained feedback code information and reference code information do not coincide, the processor 130 may obtain address values corresponding to each of the plurality of node apparatuses 200-1-200-n, store one address value among the address values corresponding to each of the plurality of node apparatuses 200-1-200-n in the address value area of the custom field, regenerate the Ethernet frame based on the custom field, and retransmit the regenerated Ethernet frame to the first node apparatus 200-1 through the communication interface 120.

If the feedback code information and the reference code information do not coincide, the processor 130 may determine that the address information was not set normally in the node network 200. The processor 130 may directly obtain address values corresponding to each of the plurality of node apparatuses 200-1-200-n. Then, the processor 130 may store one address value among the plurality of obtained address values in the address value area. Then, the processor 130 may regenerate the Ethernet frame including the obtained address value. Then, the processor 130 may transmit the regenerated Ethernet frame to the node network 200. In case the address information was not set normally, the processor 130 may perform the operation for setting the address information again.

If the feedback code information and the reference code information do not coincide, the processor 130 may determine in which node apparatus an error occurred based on the feedback code information and the reference code information. In the reference code information, the feedback code may be changed differently according to the operations of each node apparatus. Accordingly, if the reference code information and the feedback code information do not coincide, the processor 130 may identify in which node apparatus an error occurred. The processor 130 may obtain an address value corresponding to the node apparatus wherein the error occurred. Then, the processor 130 may store the obtained address value in the address value area. Then, the processor 130 may regenerate the Ethernet frame including the obtained address value. Then, the processor 130 may transmit the regenerated Ethernet frame to the node network 200. In case the address information was not set normally, the processor 130 may perform the operation for setting the address information again.

If the address information is not set normally, the processor 130 may attempt an address setting operation by a new method.

For example, the processor 130 may set the address information according to the first embodiment 310 in FIG. 3, and if it fails, the processor 130 may set the address information based on the second embodiment 320 or the third embodiment 330.

As another example, the processor 130 may set the address information according to the second embodiment 320 in FIG. 3, and if it fails, the processor 130 may set the address information based on the first embodiment 310 or the third embodiment 330.

As still another example, the processor 130 may set the address information according to the third embodiment 330 in FIG. 3, and if it fails, the processor 130 may set the address information based on the first embodiment 310 or the second embodiment 320.

In the case of using the first embodiment 310, the electronic apparatus 100 may reduce the processing time regarding the address setting operation. Also, in the case of using the second embodiment 320, the electronic apparatus 100 may remotely set all of the address values of the plurality of node apparatuses 200-1-200-n included in the node network 200.

The electronic apparatus 100 may set the address information of the plurality of node apparatuses 200-1-200-n included in the node network 200 according to various embodiments. The electronic apparatus 100 may use an Ethernet frame for setting the address information. Also, the electronic apparatus 100 may use a feedback frame for identifying whether the address information was set normally.

The electronic apparatus 100 may simply change an invalid address value by performing an initializing operation first.

FIG. 3 is a diagram for illustrating a method of setting addresses of the plurality of node apparatuses 200-1-200-n according to a plurality of embodiments.

Referring to FIG. 3, the electronic apparatus 100 may perform address setting of the plurality of node apparatuses 200-1-200-n included in the node network 200 according to various embodiments. It is assumed that the plurality of node apparatuses 200-1-200-n include the first node apparatus 200-1 and the second node apparatus 200-2. That is, it is assumed that the electronic apparatus 100, the first node apparatus 200-1, and the second node apparatus 200-2 perform serial communication. The electronic apparatus 100 may set the address information of the first node apparatus 200-1 and the address information of the second node apparatus 200-2.

According to the first embodiment 310, an address value may be calculated in the electronic apparatus 100 and the node network 200. The electronic apparatus 100 may generate an initial address value, and the node network 200 may update the generated address value.

For example, the electronic apparatus 100 may generate a first address value #ad01 of the first node apparatus 200-1. Then, the electronic apparatus 100 may transmit the first address value #ad01 to the first node apparatus 200-1.

The first node apparatus 200-1 may set the first address value #ad01 received from the electronic apparatus 100 as the address information of the first node apparatus 200-1. Then, the first node apparatus 200-1 may input the first address value #ad01 into an address generating function, and obtain a second address value #ad02. Then, the first node apparatus 200-1 may transmit the second address value #ad02 to the second node apparatus 200-2.

The second node apparatus 200-2 may set the second address value #ad02 received from the first node apparatus 200-1 as the address information of the second node apparatus 200-2.

According to the second embodiment 320, an address value may be calculated in the electronic apparatus 100, and may be stored in the address value area of the custom field.

When address setting is completed in each node apparatus, the electronic apparatus 100 may perform address setting of the next node apparatus.

For example, the electronic apparatus 100 may generate the first address value #ad01 of the first node apparatus 200-1. Then, the electronic apparatus 100 may transmit the first address value #ad01 to the first node apparatus 200-1.

The first node apparatus 200-1 may set the first address value #ad01 received from the electronic apparatus 100 as the address information of the first node apparatus 200-1. Then, the first node apparatus 200-1 may transmit a notification that the address setting operation was completed to the electronic apparatus 100.

When the notification that the address setting operation was completed is received from the first node apparatus 200-1, the electronic apparatus 100 may input the first address value #ad01 into the address generating function, and obtain the second address value #ad02. Then, the electronic apparatus 100 may transmit the second address value #ad02 to the first node apparatus 200-1. The first node apparatus 200-1 may transmit the second address value #ad02 received from the electronic apparatus 100 to the second node apparatus 200-2.

The second node apparatus 200-2 may set the second address value #ad02 received from the first node apparatus 200-1 as the address information of the second node apparatus 200-2. Then, the second node apparatus 200-2 may transmit a notification that the address setting operation was completed to the electronic apparatus 100.

According to the third embodiment 330, an address value may be calculated in the electronic apparatus 100, and may be stored in the node area of the data field. The node area may be an area corresponding to each of the plurality of node apparatuses 200-1-200-n included in the data field. The first node area may be an area corresponding to the first node apparatus 200-1, and the second node area may be an area corresponding to the second node apparatus 200-2. Explanation regarding the first node area and the second node area will be described in the embodiment 702 in FIG. 7.

For example, the electronic apparatus 100 may generate the first address value #ad01 of the first node apparatus 200-1 and the second address value #ad02 of the second node apparatus 200-2. Then, the electronic apparatus 100 may store the first address value #ad01 in the first node area of the data field, and store the second address value #ad02 in the second node area of the data field. The electronic apparatus 100 may transmit the first address value #ad01 and the second address value #ad02 to the first node apparatus 200-1.

The first node apparatus 200-1 may set the first address value #ad01 received from the electronic apparatus 100 as the address information of the first node apparatus 200-1. Then, the first node apparatus 200-1 may transmit the first address value #ad01 and the second address value #ad02 to the second node apparatus 200-2.

The second node apparatus 200-2 may set the second address value #ad02 received from the first node apparatus 200-1 as the address information of the second node apparatus 200-2.

Figure 4:
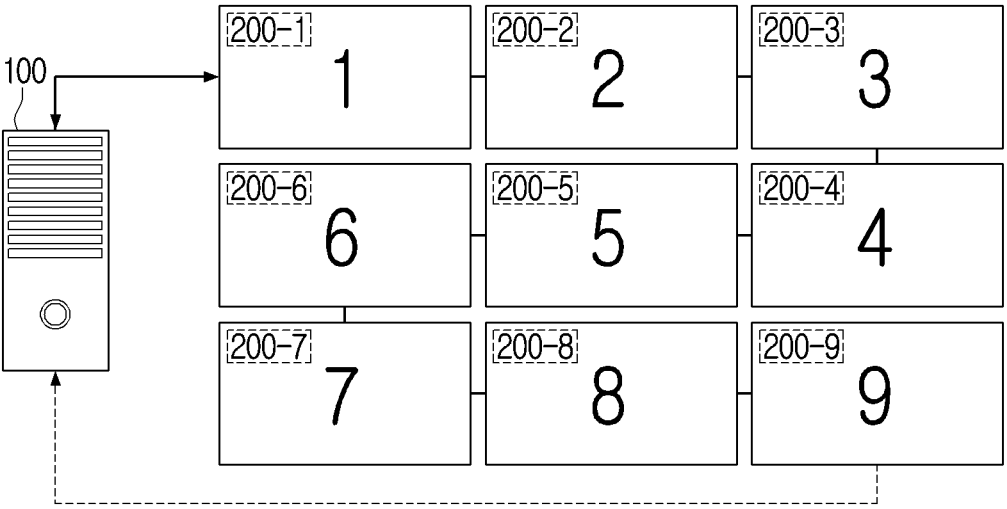
FIG. 4 is a diagram for illustrating a situation wherein a plurality of node apparatuses are implemented as display modules according to an embodiment.

FIG. 4 is a diagram for illustrating a situation wherein the node network 200 is implemented as display modules according to an embodiment.

Referring to FIG. 4, the electronic apparatus 100 may be connected with the plurality of node apparatuses 200-1-200-n through serial communication. For example, the electronic apparatus 100 may be connected with the node apparatuses in the order of the first node apparatus 200-1, the second node apparatus 200-2, the third node apparatus 200-3, the fourth node apparatus 200-4, the fifth node apparatus 200-5, the sixth node apparatus 200-6, the seventh node apparatus 200-7, the eight node apparatus 200-8, and the ninth node apparatus 200-9. According to an embodiment, the electronic apparatus 100 and the first node apparatus 200-1 may be connected through one Ethernet line. According to another embodiment, the electronic apparatus 100 and the first node apparatus 200-1 may be connected through one Ethernet line (the first Ethernet line), and the ninth node apparatus 200-9 may be serially connected with the electronic apparatus 100 through another Ethernet line (the second Ethernet line). The node apparatuses may mean display modules.

The electronic apparatus 100 may transmit an Ethernet frame to the plurality of display modules by using serial communication. Then, the plurality of display modules may display a content transmitted from the electronic apparatus 100 according to a predetermined method. Also, at least one display module among the plurality of display modules may perform a control instruction transmitted from the electronic apparatus 100. For example, at least one display module among the plurality of display modules may lower the brightness of the display module based on a control instruction transmitted from the electronic apparatus 100.

Figure 5:
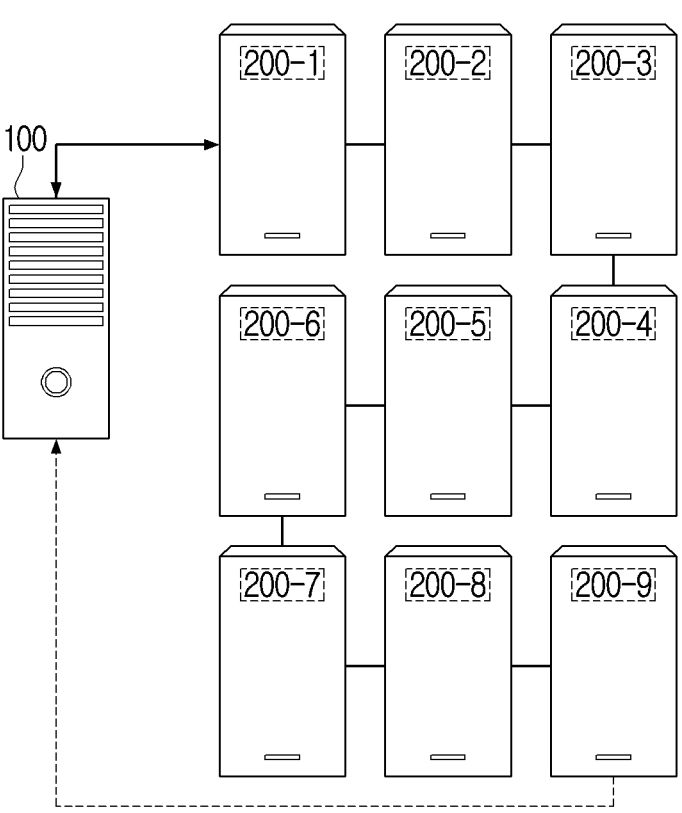
FIG. 5 is a diagram for illustrating a situation wherein a plurality of node apparatuses are implemented as speakers according to an embodiment.

FIG. 5 is a diagram for illustrating a situation wherein the node network 200 is implemented as speakers according to another embodiment.

Referring to FIG. 5, the electronic apparatus 100 may be connected with the plurality of node apparatuses 200-1-200-n through serial communication. As the order of serial connection is identical to that in FIG. 4, overlapping explanation will be omitted. The node apparatuses may mean speakers.

The electronic apparatus 100 may transmit an Ethernet frame to the plurality of speakers by using serial communication. Then, the plurality of speakers may output a content transmitted from the electronic apparatus 100 according to a predetermined method. Also, at least one speaker among the plurality of speakers may perform a control instruction transmitted from the electronic apparatus 100. For example, at least one speaker among the plurality of speakers may lower the volume of the speaker based on a control instruction transmitted from the electronic apparatus 100.

Figure 6:
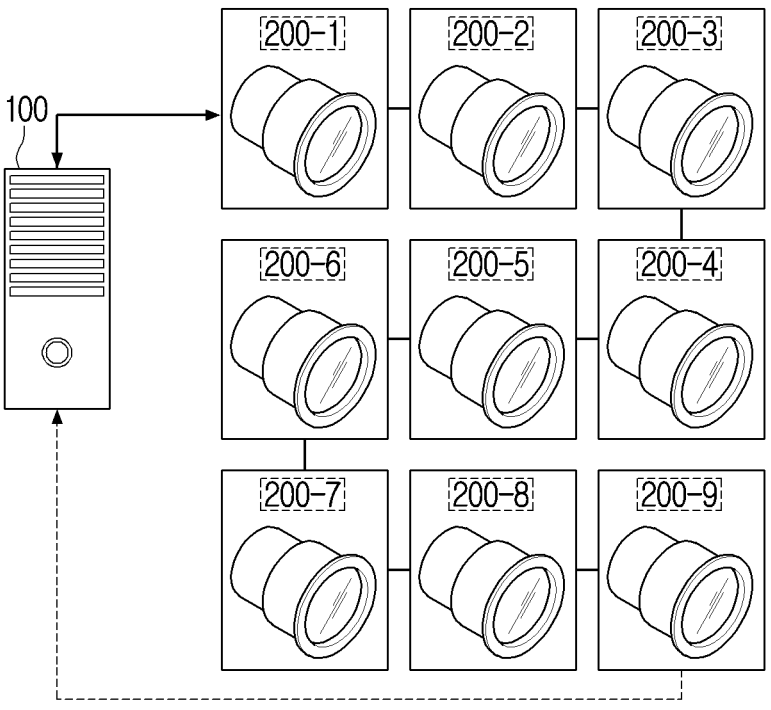
FIG. 6 is a diagram for illustrating a situation wherein a plurality of node apparatuses are implemented as lighting devices according to an embodiment.

FIG. 6 is a diagram for illustrating a situation wherein the node network 200 is implemented as lighting devices according to still another embodiment.

Referring to FIG. 6, the electronic apparatus 100 may be connected with the plurality of node apparatuses 200-1-200-n through serial communication. As the order of serial connection is identical to that in FIG. 4, overlapping explanation will be omitted. The node apparatuses may mean lighting devices.

The electronic apparatus 100 may transmit an Ethernet frame to the plurality of lighting devices by using serial communication. Then, the plurality of lighting devices may output a content transmitted from the electronic apparatus 100 according to a predetermined method. Also, at least one lighting device among the plurality of lighting devices may perform a control instruction transmitted from the electronic apparatus 100. For example, at least one lighting device among the plurality of lighting devices may lower the illumination of the lighting device based on a control instruction transmitted from the electronic apparatus 100.

FIG. 7 is a diagram for illustrating an Ethernet frame according to a plurality of embodiments.

Referring to FIG. 7, an Ethernet frame may be implemented as a single node frame 710 or a multi node frame 720. The single node frame 710 may be a frame wherein data (or instructions) transmitted to the plurality of nodes are stored in the data field 716 without distinction of each node. Also, the multi node frame 720 may be a frame wherein areas corresponding to (or allotted to) each of the plurality of nodes exist, and data that should be transmitted to a specific node is stored in an area corresponding to (or allotted to) the specific node.

Referring to an embodiment 701 in FIG. 7, the electronic apparatus 100 may generate a single node Ethernet frame 710. The single node Ethernet frame 710 may include at least one of a preamble field 711, a starting frame delimiter (SFD) field 712, a first custom field 713, a second custom field 714, a type field 715, a data field 716, a cyclic redundancy check (CRC) field 717, or an inter frame gap (IFG) field 718.

The preamble field 711 may be a field for synchronization of the bits of a receiving device and a transmitting device. Also, the preamble field 711 may be seven bytes.

The SFD field 712 may be a field for notifying start of a frame. Also, the SFD field 712 may be one byte.

The first custom field 713 may include at least one of an address code area 713-1 or a target node address area 713-2. Also, the first custom field 713 may be six bytes. The address code area 713-1 may be an area wherein address code information for controlling an address of at least one node apparatus among the plurality of node apparatuses 200-1-200-n connected to the electronic apparatus 100 is stored. For example, the address code information may include at least one of a code for not changing the address, a code for initializing the address, or a code for setting the address as a new value. Also, the address code area 713-1 may be one byte. The target node address area 713-2 may be an area wherein target node address information for performing a control instruction is stored. The plurality of node apparatuses 200-1-200-n may identify to which node a control instruction of the user should be transmitted based on the target node address information. As an example, the target node address area 713-2 may store only an address corresponding to one target node. As another example, the target node address area 713-2 may store addresses corresponding to a plurality of target nodes. Also, the target node address area 713-2 may be five bytes.

The second custom field 714 may include at least one of a control code area 714-1 or a registry address area 714-2. Also, the second custom field 714 may be six bytes. The control code area 714-1 may be an area wherein control code information related to at least one of the number or the transmission method of the target node apparatuses is stored. Also, the control code area 714-1 may be one byte. The registry address area 714-2 may be an area wherein registry address information of the node apparatuses used for performing a control instruction is stored. Also, the registry address area 714-2 may be five bytes.

The type field 715 may be a field for indicating the types of packets of an upper protocol. Also, the type field 715 may be two bytes.

The data field 716 may be a field for storing data transmitted to the plurality of node apparatuses 200-1-200-n. Also, the data field 716 may be from 42 bytes to 1500 bytes. Meanwhile, 42 bytes which is the minimum byte size may be replaced by 46 bytes. The data field 716 may mean a payload. The data field 716 may include at least one of a content area 716-0, a first burst area 716-1, a second burst area 716-2, a third burst area 716-3, or an nth burst area 716-*n*. The content area 716-0 may be an area wherein contents transmitted to the plurality of node apparatuses 200-1-200-*n* are stored. The plurality of burst areas 716-1 to 716-*n* may be areas wherein control instructions are stored. The plurality of burst areas were described as burst areas, but the burst areas may be described as data areas, etc. depending on implementation examples.

The CRC field 717 may be a field for identifying integrity regarding a result of an operation performed in the node apparatuses. The CRC field 717 may be an area wherein feedback codes are stored. Also, the CRC field 717 may be four bytes.

The IFG field 718 may be a field defining a time interval of transmitting a frame. Also, the IFG field 718 may be 12 bytes.

Referring to the embodiment 702 in FIG. 7, the electronic apparatus 100 may generate a multi node Ethernet frame 720. The multi node Ethernet frame 720 may have the same structure as a single node Ethernet frame 710. However, the data field 726 of the multi node Ethernet frame 720 may be different from the data field 716 of the single node Ethernet frame 710.

The data field 726 of the multi node Ethernet frame 720 may include at least one of a content area 726-0, a first node area 726-1, a second node area 726-2, a third node area 726-3, or an nth node area 726-*n*. The content area 726-0 may be an area wherein contents transmitted to the plurality of node apparatuses 200-1-200-*n* are stored. The plurality of node areas 726-1 to 726-*n* may be areas corresponding to each of the plurality of node apparatuses 200-1-200-*n*. Also, the plurality of node areas 726-1 to 726-*n* may be areas wherein control instructions corresponding to each of the plurality of node apparatuses 200-1-200-*n* are stored.

In FIG. 7, it was described that a content area is included. However, in a situation wherein it is not necessary to provide a content, the electronic apparatus 100 may generate an Ethernet frame based on a data field not including a content area.

FIG. 8 is a table for illustrating control code information.

Referring to FIG. 8, the table 805 may indicate control codes of various types. Except the control codes described in the table 805, other control codes may further exist.

The "0000_0000" code may mean a code indicating a situation wherein there is no control instruction. An operation of displaying a content may not be an operation that is performed by a control instruction, but it may be an operation that is always performed. Accordingly, even if the "0000_0000" code is identified, the plurality of node apparatuses 200-1-200-*n* may perform an operation of displaying a content.

The "0000_0001" code may be a code indicating that a writing operation is performed to one target node in a general mode.

The "0000_0010" code may be a code indicating that a reading operation is performed to one target node in the general mode.

The "0000_0011" code may be a code indicating that a writing operation is performed to one target node in a burst mode. The burst mode may mean a mode wherein data stored in a plurality of unit areas is continuously transmitted by one request.

The "0000_0100" code may be a code indicating that a reading operation is performed to one target node in the burst mode.

The "1000_0001" code may be a code indicating that a writing operation is performed to a plurality of target nodes.

The "1000_0010" code may be a code indicating that a reading operation is performed to a plurality of target nodes.

The general mode may mean the various conventional data transmission methods. For example, the general mode may mean a method of transmitting data based on at least one of a predetermined packet unit or a predetermined time unit.

The burst mode may be a method of transmitting data continuously without discontinuity unless there is interruption. In the burst mode, data may be transmitted at a higher speed than in the general mode. The burst mode may be used in case the size of the data is small or the communication time is short. Also, the burst mode may mean an operation mode of serially transmitting or receiving data of a predetermined number (or a predetermined burst size or a predetermined burst length). In addition, the burst mode may mean a mode of sequentially performing a reading operation or a writing operation as data of a specific number fits into a continuous clock cycle.

WR may be a description corresponding to a writing operation. Also, RD may be a description corresponding to a reading operation.

Figure 9:
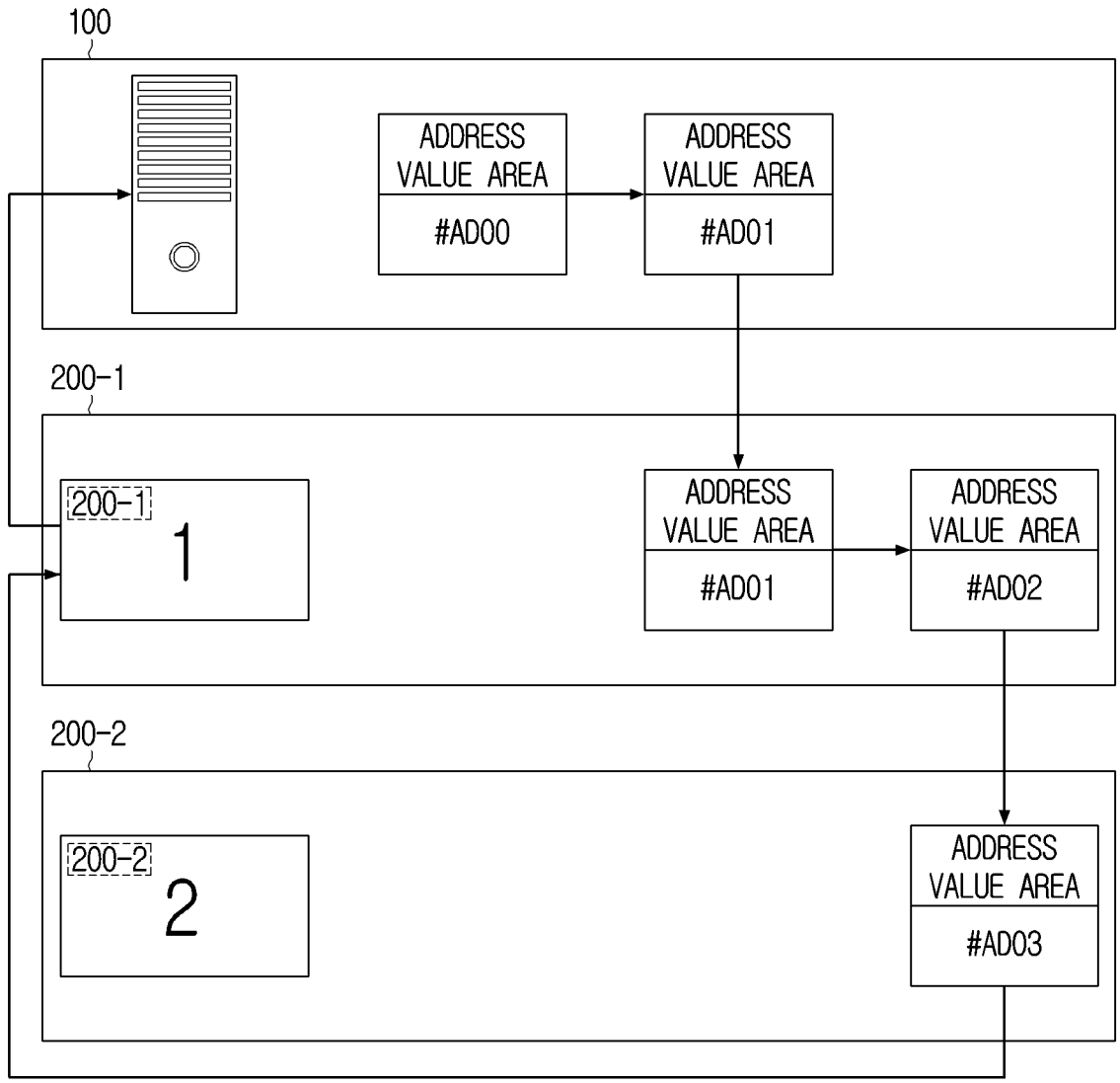
FIG. 9 is a diagram for illustrating a method of setting addresses according to an embodiment.

FIG. 9 is a diagram for illustrating a method of setting addresses according to a first embodiment.

Referring to FIG. 9, the electronic apparatus 100 may store an address value in the address value area. Then, the electronic apparatus 100 may generate an Ethernet frame including the address value area. According to an embodiment, the address value area may be included in the custom field of the Ethernet frame. According to another embodiment, an address value may be stored in the data field of the Ethernet frame. Also, the first node apparatus 200-1 and the second node apparatus 200-2 included in the electronic apparatus 100 and the node network 200 may store address value generating functions for generating address values.

The electronic apparatus 100 may store a basic address value #ad00 in the address value area. The basic address value #ad00 may be a default value. The electronic apparatus 100 may obtain a first address value #ad01 by inputting the basic address value #ad00 into the address value generating function. The address value generating function may be a predetermined function. Then, the electronic apparatus 100 may store the first address value #ad01 in the address value area. Then, the electronic apparatus 100 may transmit the first address value #ad01 to the first node apparatus 200-1.

The first node apparatus 200-1 may set the first address value #ad01 received from the electronic apparatus 100 as the address information of the first node apparatus 200-1. Then, the first node apparatus 200-1 may obtain a second address value #ad02 by inputting the first address value #ad01 into the address value generating function. Then, the first node apparatus 200-1 may store the second address value #ad02 in the address value area. Then, the first node apparatus 200-1 may transmit the second address value #ad02 to the second node apparatus 200-2.

The second node apparatus 200-2 may set the second address value #ad02 received from the first node apparatus 200-1 as the address information of the second node apparatus 200-2. Then, the second node apparatus 200-2 may obtain the third address value #ad03 by inputting the second address value #ad02 into the address value generating function. Then, the second node apparatus 200-2 may store the third address value #ad03 in the address value area. Then, the second node apparatus 200-2 may transmit a feedback frame including the third address value #ad03 to the electronic apparatus 100 based on the result regarding the address setting operation.

The second node apparatus 200-2 may transmit the feedback frame in a reverse direction (or a reverse route) to the electronic apparatus 100. For example, the second node apparatus 200-2 may transmit the feedback frame to the first node apparatus 200-1, and the first node apparatus 200-1 may transmit the feedback frame to the electronic apparatus 100 again. As a result, the second node apparatus 200-2 may transmit the feedback frame to the electronic apparatus 100.

Figure 10:
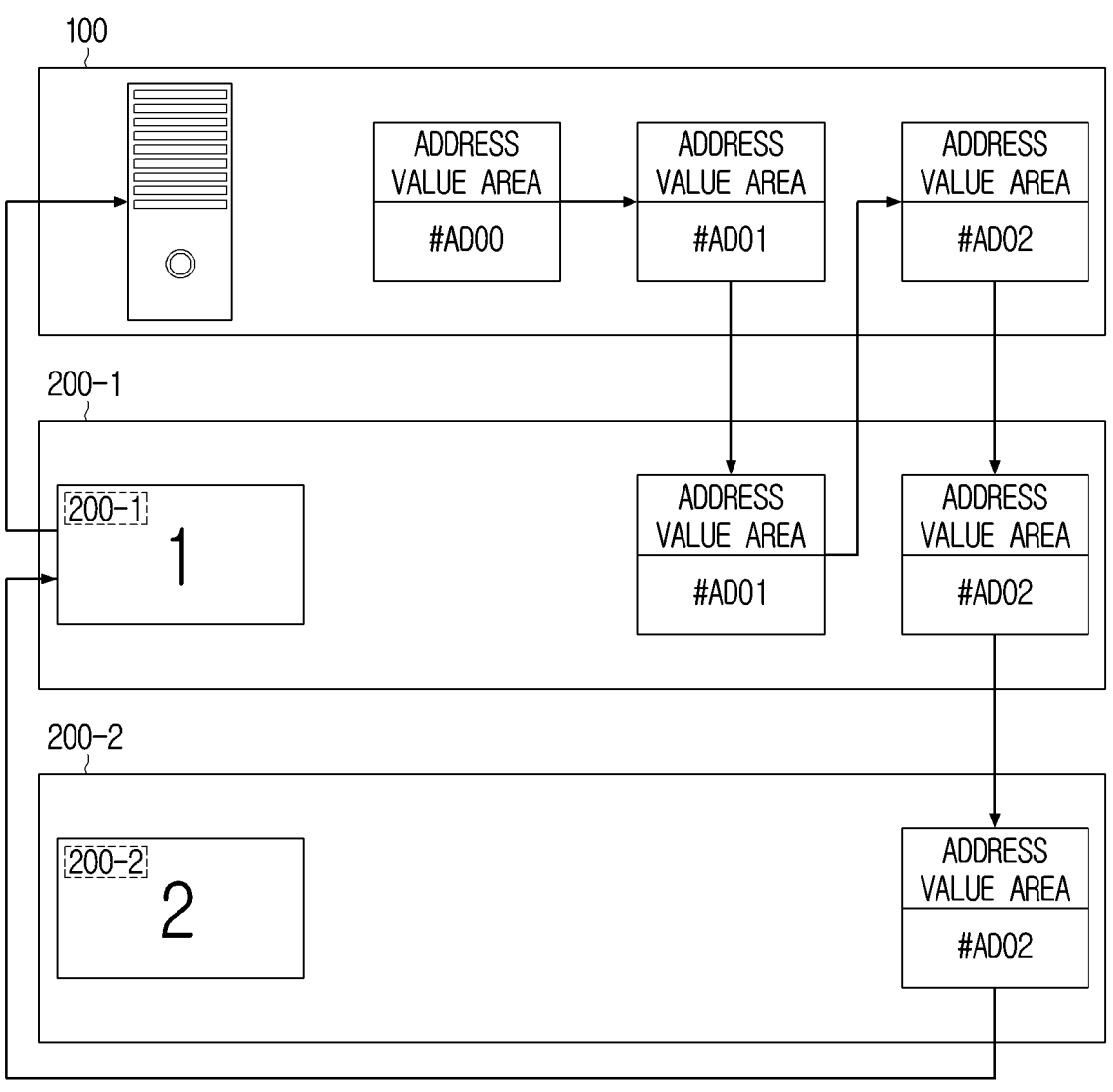
FIG. 10 is a diagram for illustrating a method of setting addresses according to an embodiment.

FIG. 10 is a diagram for illustrating a method of setting addresses according to an embodiment.

Referring to FIG. 10, the electronic apparatus 100 may store an address value in the address value area. Then, the electronic apparatus 100 may store an address value generating function for generating an address value.

The electronic apparatus 100 may store a basic address value #ad00 in the address value area. The basic address value #ad00 may be a default value. The electronic apparatus 100 may obtain a first address value #ad01 by inputting the basic address value #ad00 into the address value generating function. The address value generating function may be a predetermined function. Then, the electronic apparatus 100 may store the first address value #ad01 in the address value area. Then, the electronic apparatus 100 may transmit the first address value #ad01 to the first node apparatus 200-1.

The first node apparatus 200-1 may set the first address value #ad01 received from the electronic apparatus 100 as the address information of the first node apparatus 200-1. Then, the first node apparatus 200-1 may transmit information for notifying completion of address setting to the electronic apparatus 100. The first node apparatus 200-1 may transmit a first feedback frame including the information for notifying completion of address setting to the electronic apparatus 100.

When the information for notifying completion of address setting is received from the first node apparatus 200-1, the electronic apparatus 100 may obtain a second address value #ad02 by inputting the first address value #ad01 into the address value generating function. Then, the electronic apparatus 100 may store the second address value #ad02 in the address value area. Then, the electronic apparatus 100 may transmit the second address value #ad02 to the first node apparatus 200-1.

The first node apparatus 200-1 may transmit the second address value #ad02 received from the electronic apparatus 100 to the second node apparatus 200-2.

The second node apparatus 200-2 may set the second address value #ad02 received from the first node apparatus 200-1 as the address information of the second node apparatus 200-2. Then, the second node apparatus 200-2 may transmit a second feedback frame to the electronic apparatus 100 based on the result regarding the address setting operation.

The second node apparatus 200-2 may transmit the second feedback frame in a reverse direction (or a reverse route) to the electronic apparatus 100. For example, the second node apparatus 200-2 may transmit the second feedback frame to the first node apparatus 200-1, and the first node apparatus 200-1 may transmit the second feedback frame to the electronic apparatus 100 again. As a result, the second node apparatus 200-2 may transmit the second feedback frame to the electronic apparatus 100.

Figure 11:
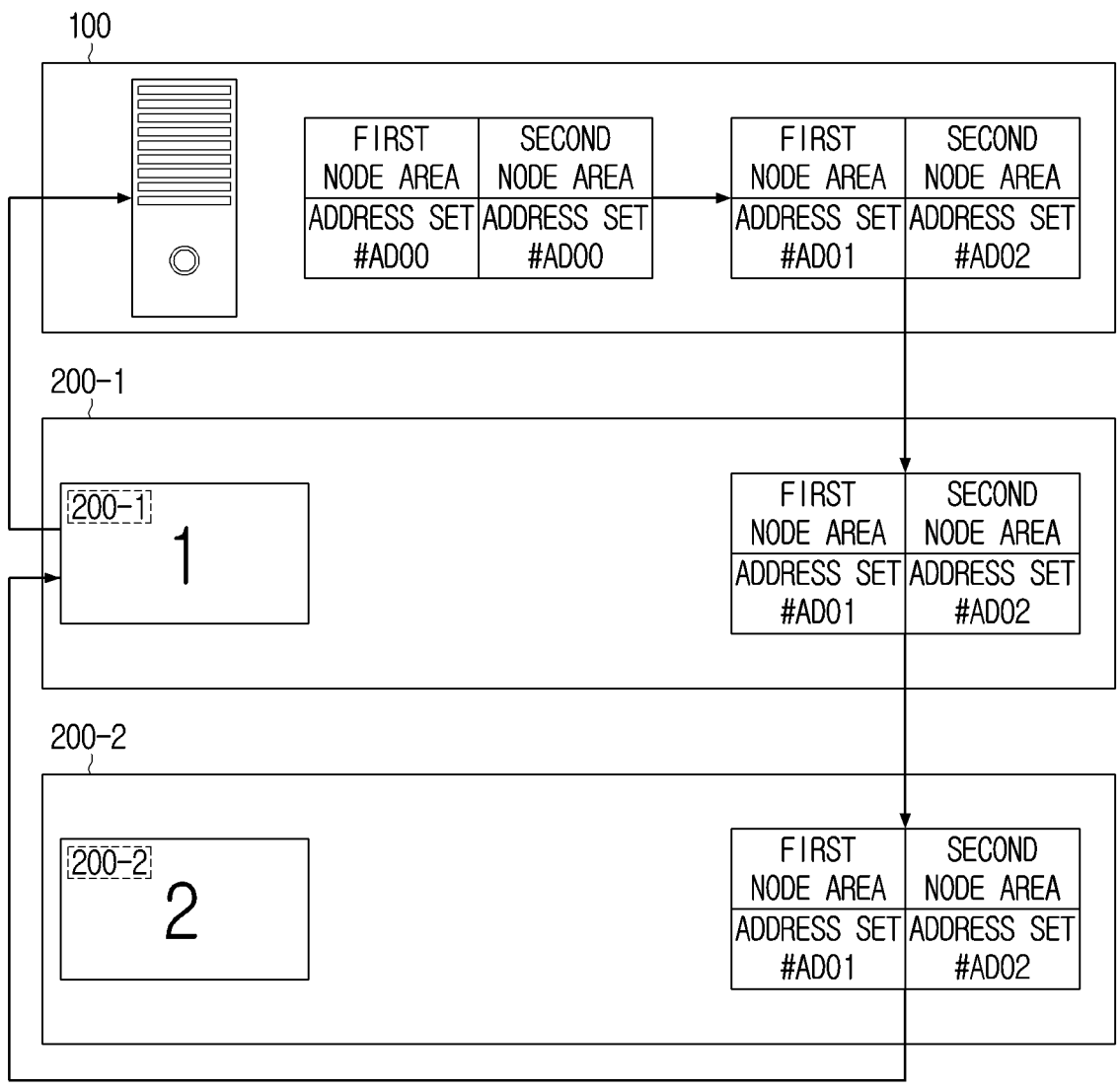
FIG. 11 is a diagram for illustrating a method of setting addresses according to an embodiment.

FIG. 11 is a diagram for illustrating a method of setting addresses according to a third embodiment.

Referring to FIG. 11, the electronic apparatus 100 may store address setting instructions and address values in node areas corresponding to each node apparatus. The node areas may be included in the data field of the Ethernet frame. Also, the plurality of node areas may mean areas corresponding to each of the plurality of node apparatuses 200-1-200-n. For example, the first node area may mean an area corresponding to the first node apparatus 200-1, and the second node area may mean an area corresponding to the second node apparatus 200-2. Detailed explanation regarding the node areas will be described in the embodiment 702 in FIG. 7.

The electronic apparatus 100 may store the basic address value #ad00 in the first node area, and store the basic address value #ad00 in the second node area. Then, the electronic apparatus 100 may obtain the first address value #ad01 by inputting the basic address value #ad00 into the address value generating function. Then, the electronic apparatus 100 may obtain the second address value #ad02 by inputting the first address value #ad01 into the address value generating function. Then, the electronic apparatus 100 may store the first address value #ad01 in the first node area, and store the second address value #ad02 in the second node area. Then, the electronic apparatus 100 may transmit the Ethernet frame including the first node area and the second node area to the first node apparatus 200-1.

The first node apparatus 200-1 may obtain the first address value #ad01 stored in the first node area based on the Ethernet frame received from the electronic apparatus 100. Then, the first node apparatus 200-1 may set the first address value #ad01 as the address information of the first node apparatus 200-1. Then, the first node apparatus 200-1 may transmit the Ethernet frame (or the first feedback frame) including the first address value #ad01 and the second address value #ad02 to the second node apparatus 200-2.

The second node apparatus 200-2 may obtain the second address value #ad02 stored in the second node area based on the Ethernet frame received from the first node apparatus 200-1. Then, the second node apparatus 200-2 may set the second address value #ad02 as the address information of the second node apparatus 200-2. Then, the second node apparatus 200-2 may transmit the Ethernet frame (the second feedback frame) to the electronic apparatus 100 based on the result regarding the address setting operation.

The second node apparatus 200-2 may transmit the feedback frame (the second feedback frame) to the electronic apparatus 100 in a reverse direction (or a reverse route). For example, the second node apparatus 200-2 may transmit the feedback frame (the second feedback frame) to the first node apparatus 200-1, and the first node apparatus 200-1 may transmit the feedback frame (the second feedback frame) to the electronic apparatus 100 again. As a result, the second node apparatus 200-2 may transmit the feedback frame (the second feedback frame) to the electronic apparatus 100.

Figure 12:
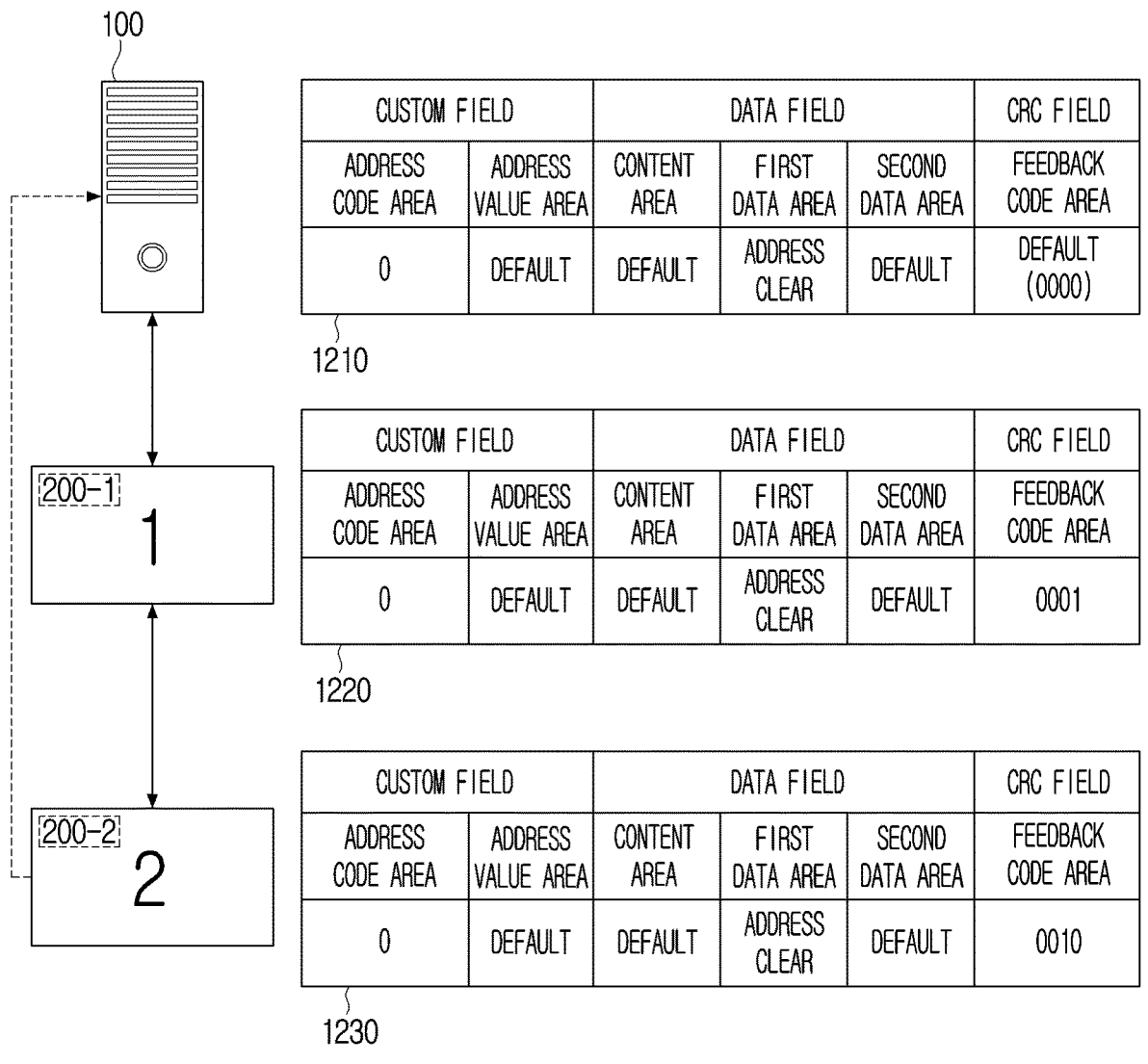
FIG. 12 is a diagram for illustrating an operation of initializing address values according to an embodiment.

FIG. 12 is a diagram for illustrating an operation of initializing address values according to a first embodiment.

Referring to FIG. 12, the electronic apparatus 100 may initialize the address information of the plurality of node apparatuses 200-1-200-n included in the node network 200. It is assumed that the node network 200 includes the first node apparatus 200-1 and the second node apparatus 200-2. The electronic apparatus 100 may generate an Ethernet frame including a custom field, a data field, and a CRC field. The custom field may include an address code area and an address value area. The data field may include a content area, a first data area, and a second data area.

The electronic apparatus 100 may generate an Ethernet frame 1210 for setting of initialization. The electronic apparatus 100 may obtain an address code 0 for setting of initialization. The address code 0 may be a code for initializing the address information set in the plurality of node apparatuses 200-1-200-n. Then, the electronic apparatus 100 may store the address code 0 in the address code area. The electronic apparatus 100 may store a default value in the address value area and the content area. This is because an address value and a content are not needed in an initializing operation. Also, the electronic apparatus 100 may store a control instruction (address clear) related to the initializing operation in the first data area. Although it is described that a control instruction (address clear) is stored in the first data area, a separate control instruction (address clear) may not be stored in the first data area depending on implementation examples. This is because a control operation can be identified by the address code 0 itself, and each of the plurality of node apparatuses 200-1-200-n can directly perform an initializing operation corresponding to the address code 0. Also, the electronic apparatus 100 may store a feedback code 0000 in a feedback code area included in the CRC field. The feedback code 0000 may be a default value. The electronic apparatus 100 may transmit the Ethernet frame 1210 for setting of initialization to the first node apparatus 200-1.

The first node apparatus 200-1 may receive the Ethernet frame 1210 from the electronic apparatus 100.

An address initializing operation may be performed according to various methods.

According to an address initializing operation according to an embodiment, the first node apparatus 200-1 may obtain an address code 0 based on the address code area included in the Ethernet frame 1210. Then, the first node apparatus 200-1 may perform an operation corresponding to the address code 0 (the initializing operation).

According to an address initializing operation according to another embodiment, the first node apparatus 200-1 may perform an initializing operation based on a control instruction (address clear) stored in the first data area.

Then, the first node apparatus 200-1 may update the feedback code based on the result regarding the initializing operation. The first node apparatus 200-1 may obtain a feedback code 0000 based on the Ethernet frame 1210 received from the electronic apparatus 100. Then, the first node apparatus 200-1 may obtain a feedback code 0001 by inputting the feedback code 0000 into a predetermined function. The predetermined function may mean a function of which code value increases based on a predetermined operation. For example, the predetermined function may be a function of which code value increases as much as "1" if an initializing operation is performed normally. Then, the first node apparatus 200-1 may obtain a first feedback frame 1220 based on the feedback code 0001. Then, the first node apparatus 200-1 may transmit the first feedback frame 1220 to the second node apparatus 200-2.

The second node apparatus 200-2 may receive the first feedback frame 1220 from the first node apparatus 200-1.

According to an address initializing operation according to an embodiment, the second node apparatus 200-2 may obtain the address code 0 based on the address code area included in the first feedback frame 1220. Then, the second node apparatus 200-2 may perform an operation corresponding to the address code 0 (an initializing operation).

According to an address initializing operation according to another embodiment, the second node apparatus 200-2 may perform an initializing operation based on a control instruction (address clear) stored in the first data area.

Then, the second node apparatus 200-2 may update the feedback code based on the result regarding the initializing operation. The second node apparatus 200-2 may obtain a feedback code 0001 based on the first feedback frame 1220 received from the first node apparatus 200-1. Then, the second node apparatus 200-2 may obtain a feedback code 0010 by inputting the feedback code 0001 into a predetermined function. The predetermined function may mean a function of which code value increases based on a predetermined operation. For example, the predetermined function may be a function of which code value increases as much as "1" if an initializing operation is performed normally. Then, the second node apparatus 200-2 may obtain a second feedback frame 1230 based on the feedback code 0010. Then, the second node apparatus 200-2 may transmit the second feedback frame 1230 to the electronic apparatus 100. The second node apparatus 200-2 may transmit the second feedback frame 1230 in a reverse direction (or a reverse route) to the electronic apparatus 100. For example, the second node apparatus 200-2 may transmit the second feedback frame 1230 to the first node apparatus 200-1, and the first node apparatus 200-1 may transmit the second feedback frame 1230 to the electronic apparatus 100 again. As a result, the second node apparatus 200-2 may transmit the second feedback frame 1230 to the electronic apparatus 100.

The electronic apparatus 100 may identify integrity regarding the initializing operations performed in the first node apparatus 200-1 and the second node apparatus 200-2 based on the second feedback frame 1230 received from the second node apparatus 200-2. The electronic apparatus 100 may obtain the feedback code 0010 included in the second feedback frame 1230. Then, the electronic apparatus 100 may identify integrity by comparing with the prestored reference code based on the feedback code 0010. A detailed operation regarding an integrity operation will be described in FIG. 20 and FIG. 21.

FIG. 13 is a diagram for illustrating an operation of setting address values according to an embodiment.

Referring to FIG. 13, the electronic apparatus 100 may transmit an Ethernet frame for address setting to the node network 200.

The electronic apparatus 100 may generate an Ethernet frame 1310 for address setting. The electronic apparatus 100 may obtain an address code 1 for address setting. The address code 1 may be a code for setting the address information set in the plurality of node apparatuses 200-1-200-n. Then, the electronic apparatus 100 may store the address code 1 in the address code area. Also, the electronic apparatus 100 may input a basic address value #ad00 in the address value area into the address value generating function and obtain a first address value #ad01. Then, the electronic apparatus 100 may store the first address value #ad01 in the address value area. The electronic apparatus 100 may store a default value in the content area. This is because a content is not needed in the address setting operation. Also, the electronic apparatus 100 may store a control instruction (address set) related to the address setting operation in the first data area. It was described that the control instruction (address set) is stored in the first data area, but a separate control instruction (address set) may not be stored in the first data area depending on implementation examples. This is because a control operation can be identified by the address code 1 itself, and each of the plurality of node apparatuses 200-1-200-n can directly perform an address setting operation corresponding to the address code 1. Also, the electronic apparatus 100 may store an address value generating function n=n+1 in the second data area. It was described that the address value generating function is stored in the second data area, but a separate address value generating function n=n+1 may not be stored in the second data area depending on implementation examples. This is because the address value generating function itself can already be stored in both of the electronic apparatus 100 and the first node apparatus 200-1. Also, the electronic apparatus 100 may store a feedback code 0000 in the feedback code area included in the CRC field. The feedback code 0000 may be a default value. The electronic apparatus 100 may transmit an Ethernet frame 1310 for address setting to the first node apparatus 200-1.

The first node apparatus 200-1 may receive the Ethernet frame 1310 from the electronic apparatus 100.

An address setting operation may be performed according to various methods.

According to an address setting operation according to an embodiment, the first node apparatus 200-1 may obtain an address code 1 based on the address code area included in the Ethernet frame 1310. Then, the first node apparatus 200-1 may perform an operation corresponding to the address code 1 (the address setting operation). The first node apparatus 200-1 may set the first address value #ad01 stored in the address value area as address information.

According to an address setting operation according to another embodiment, the first node apparatus 200-1 may perform an address setting operation based on a control instruction (address set) stored in the first data area.

An address value may be obtained according to various methods.

According to an address value obtaining operation according to an embodiment, the first node apparatus 200-1 may obtain a second address value #ad02 by inputting a first address value #ad01 into an address value generating function already stored in the first node apparatus 200-1. Then, the first node apparatus 200-1 may store the second address value #ad02 in the address value area.

Also, according to an address value obtaining operation according to another embodiment, the first node apparatus 200-1 may obtain a second address value #ad02 by inputting a first address value #ad01 into an address value generating function n=n+1 stored in the second data area.

In addition, the first node apparatus 200-1 may update the feedback code based on the result regarding the address setting operation. The first node apparatus 200-1 may obtain a feedback code 0000 based on the Ethernet frame 1310 received from the electronic apparatus 100. Then, the first node apparatus 200-1 may obtain a feedback code 0010 by inputting the feedback code 0000 into a predetermined function. The predetermined function may mean a function of which code value increases based on a predetermined operation. For example, the predetermined function may be a function of which code value increases as much as "2" if an address setting operation is performed normally. Then, the first node apparatus 200-1 may obtain a first feedback frame 1320 based on the second address value #ad02 and the feedback code 0010. Then, the first node apparatus 200-1 may transmit the first feedback frame 1320 to the second node apparatus 200-2.

The second node apparatus 200-2 may receive the first feedback frame 1320 from the first node apparatus 200-1.

According to an address setting operation according to an embodiment, the second node apparatus 200-2 may obtain an address code 1 based on the address code area included in the first feedback frame 1320. Then, the second node apparatus 200-2 may perform an operation corresponding to the address code 1 (the address setting operation). The second node apparatus 200-2 may set the second address value #ad02 stored in the address value area as address information.

According to an address setting operation according to another embodiment, the first node apparatus 200-1 may perform an address setting operation based on a control instruction (address set) stored in the first data area.

According to an address value obtaining operation according to an embodiment, the second node apparatus 200-2 may obtain a third address value #ad03 by inputting a second address value #ad02 into an address value generating function already stored in the second node apparatus 200-2. Then, the second node apparatus 200-2 may store the third address value #ad03 in the address value area.

Also, according to an address value obtaining operation according to another embodiment, the second node apparatus 200-2 may obtain a third address value #ad03 by inputting a second address value #ad02 into an address value generating function n=n+1 stored in the second data area. The third address value #ad03 is substantially returned to the electronic apparatus 100, and thus it may not be used as an address of a node. The electronic apparatus 100 may identify whether an address value was calculated normally in the node network 200 based on the third address value #ad03.

Then, the second node apparatus 200-2 may update the feedback code based on the result regarding the address setting operation. The second node apparatus 200-2 may obtain a feedback code 0010 based on the first feedback frame 1320 received from the first node apparatus 200-1. Then, the second node apparatus 200-2 may obtain a feedback code 0100 by inputting the feedback code 0010 into a predetermined function. The predetermined function may mean a function of which code value increases based on a predetermined operation. For example, the predetermined function may be a function of which code value increases as much as "2" if an address setting operation is performed normally. Then, the second node apparatus 200-2 may obtain a second feedback frame 1330 based on the third address value #ad03 and the feedback code 0100. Then, the second node apparatus 200-2 may transmit the second feedback frame 1330 to the electronic apparatus 100. The second node apparatus 200-2 may transmit the second feedback frame 1330 in a reverse direction (or a reverse route) to the electronic apparatus 100. For example, the second node apparatus 200-2 may transmit the second feedback frame 1330 to the first node apparatus 200-1, and the first node apparatus 200-1 may transmit the second feedback frame 1330 to the electronic apparatus 100 again. As a result, the second node apparatus 200-2 may transmit the second feedback frame 1330 to the electronic apparatus 100. The electronic apparatus 100 may identify integrity regarding the address setting operations performed in the first node apparatus 200-1 and the second node apparatus 200-2 based on the second feedback frame 1330 received from the second node apparatus 200-2. The electronic apparatus 100 may obtain the feedback code 0100 included in the second feedback frame 1330. Then, the electronic apparatus 100 may identify integrity by comparing with the prestored reference code based on the feedback code 0100. A detailed operation regarding an integrity operation will be described in FIG. 20 and FIG. 21.

The address value initializing operation according to the second embodiment may correspond to the initializing operation according to the first embodiment in FIG. 12. However, as in FIG. 14, the address value initializing operation may be performed partially differently.

Figure 14:
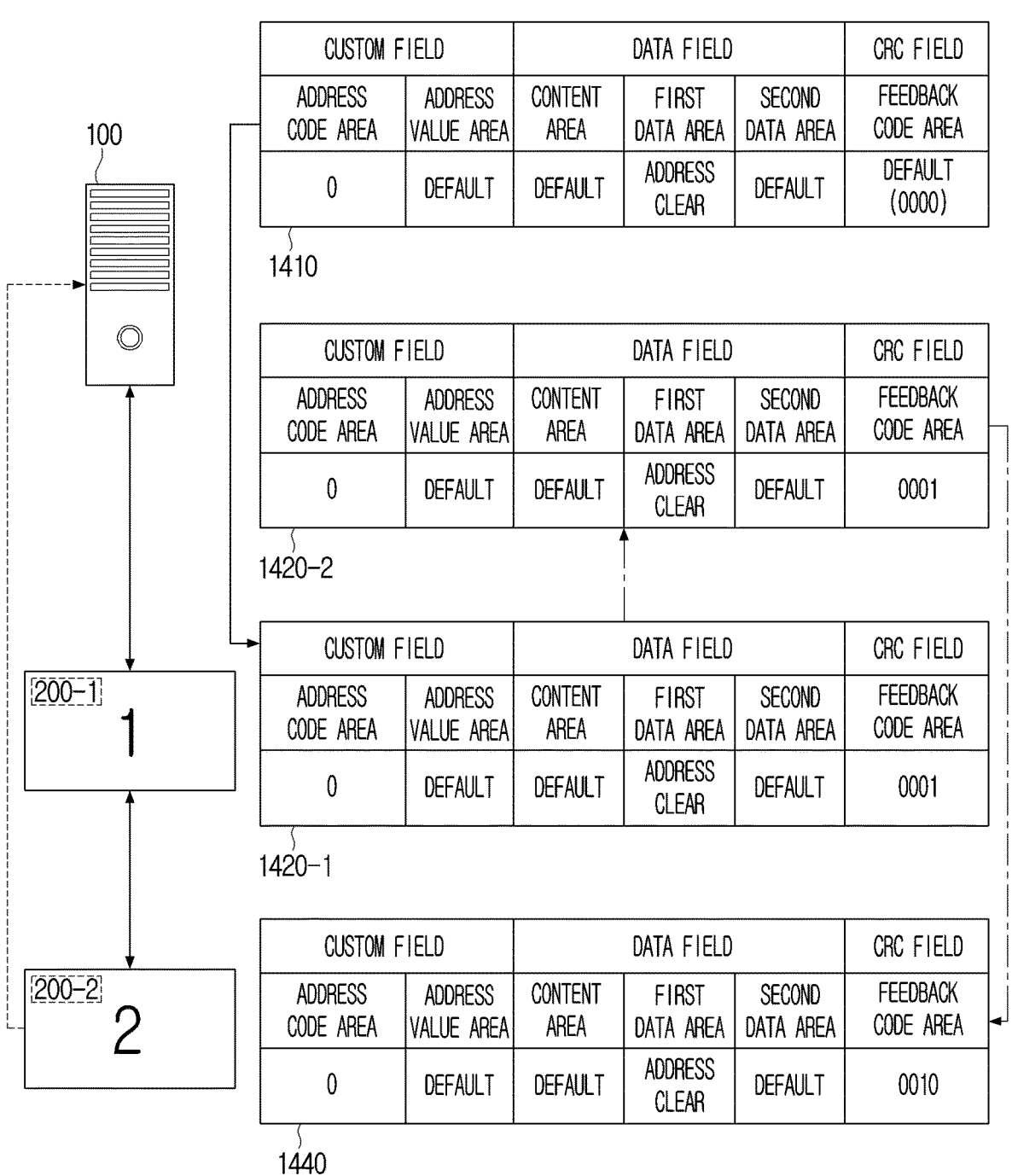
FIG. 14 is a diagram for illustrating an operation of initializing address values according to an embodiment.

FIG. 14 is a diagram for illustrating an operation of initializing address values according to a second embodiment.

Referring to FIG. 14, the electronic apparatus 100 may generate an Ethernet frame 1410 for setting of initialization. As the Ethernet frame 1410 may correspond to the Ethernet frame 1210 in FIG. 12, overlapping explanation will be omitted.

The first node apparatus 200-1 may receive the Ethernet frame 1410 from the electronic apparatus 100, and perform an initializing operation based on the received Ethernet frame 1410. Then, the first node apparatus 200-1 may generate a first feedback frame 1420. As the first feedback frame 1420 may correspond to the first feedback frame 1220 in FIG. 12, overlapping explanation will be omitted.

Unlike in FIG. 12, the first node apparatus 200-1 in FIG. 14 may transmit the first feedback frame 1420 to the electronic apparatus 100. Then, the electronic apparatus 100 may identify integrity regarding an initializing operation performed in the first node apparatus 200-1 based on the first feedback frame 1420. The electronic apparatus 100 may obtain a feedback code 0001 included in the first feedback frame 1420. Then, the electronic apparatus 100 may identify integrity by comparing with the prestored reference code based on the feedback code 0001. A detailed operation regarding an integrity operation will be described in FIG. 20 and FIG. 21.

When integrity regarding the initializing operation performed in the first node apparatus 200-1 is identified, the electronic apparatus 100 may transmit the first feedback frame 1420 to the second node apparatus 200-2 again for the initializing operation. As the electronic apparatus 100 and the node network 200 perform serial communication, the electronic apparatus 100 may transmit the first feedback frame 1420 to the first node apparatus 200-1, and the first node apparatus 200-1 may transmit the first feedback frame 1420 to the second node apparatus 200-2 again.

The second node apparatus 200 may receive the first feedback frame 1420 from the first node apparatus 200-1, and perform an initializing operation based on the received first feedback frame 1420. Then, the second node apparatus 200-2 may generate a second feedback frame 1430. Then, the second node apparatus 200-2 may transmit the second feedback frame 1430 to the electronic apparatus 100. As the second feedback frame 1430 may correspond to the second feedback frame 1230 in FIG. 12, overlapping explanation will be omitted. The second node apparatus 200-2 may transmit the second feedback frame 1430 in a reverse direction (or a reverse route) to the electronic apparatus 100. For example, the second node apparatus 200-2 may transmit the second feedback frame 1430 to the first node apparatus 200-1, and the first node apparatus 200-1 may transmit the second feedback frame 1430 to the electronic apparatus 100 again. As a result, the second node apparatus 200-2 may transmit the second feedback frame 1430 to the electronic apparatus 100.

The electronic apparatus 100 may identify integrity regarding the initializing operations performed in the first node apparatus 200-1 and the second node apparatus 200-2 based on the second feedback frame 1430 received from the second node apparatus 200-2. The electronic apparatus 100 may obtain a feedback code 0010 included in the second feedback frame 1430. Then, the electronic apparatus 100 may identify integrity by comparing with the prestored reference code based on the feedback code 0010. A detailed operation regarding an integrity operation will be described in FIG. 20 and FIG. 21.

Figure 15:
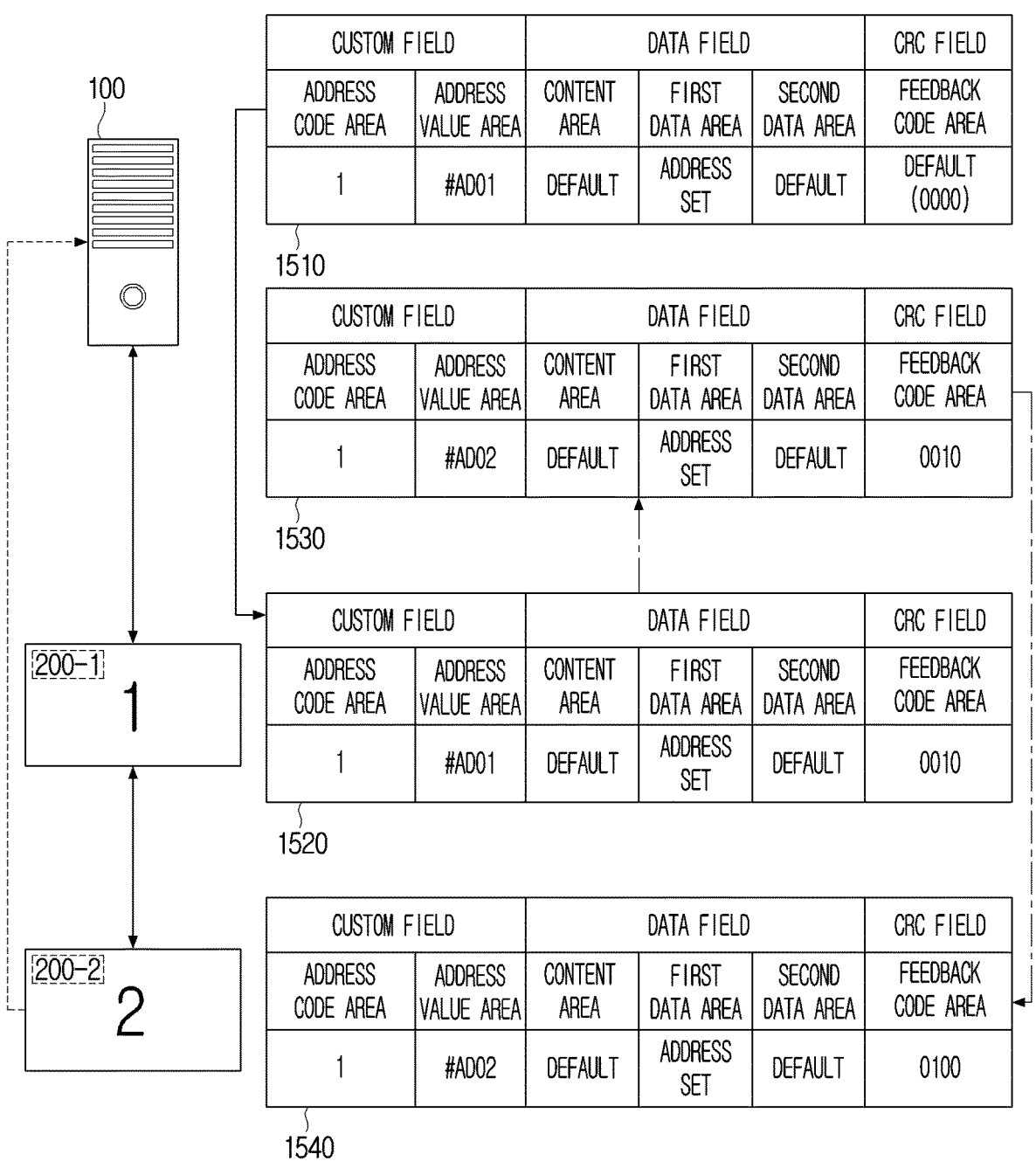
FIG. 15 is a diagram for illustrating an operation of setting address values according to an embodiment.

FIG. 15 is a diagram for illustrating an operation of setting address values according to a second embodiment.

Referring to FIG. 15, the electronic apparatus 100 may directly calculate an address value, and set address information of the plurality of node apparatuses 200-1-200-$n$ included in the node network 200.

The electronic apparatus 100 may generate an Ethernet frame 1510 for address setting. As an operation related to this is identical to the operation of generating the Ethernet frame 1310 in FIG. 13, overlapping explanation will be omitted. The electronic apparatus 100 may transmit the Ethernet frame 1510 to the first node apparatus 200-1.

The first node apparatus 200-1 may perform an address setting operation based on the Ethernet frame 1510 received from the electronic apparatus 100. The first node apparatus 200-1 may set the first address value #ad01 stored in the Ethernet frame 1510 as the address information. Then, the first node apparatus 200-1 may generate a first feedback frame 1520 based on the result regarding the address setting operation. Explanation regarding the address setting operation and the operation of generating the first feedback frame 1520 may correspond to the address setting operation of the first node apparatus 200-1 in FIG. 13 and the first feedback frame 1320 in FIG. 13, and thus overlapping explanation will be omitted. Unlike in FIG. 13, the first node apparatus 200-1 may transmit the first feedback frame 1520 to the electronic apparatus 100.

The electronic apparatus 100 may identify integrity regarding the address setting operation performed in the first node apparatus 200-1 based on the first feedback frame 1520 received from the first node apparatus 200-1. The electronic apparatus 100 may obtain a feedback code 0010 included in the first feedback frame 1520. Then, the electronic apparatus 100 may identify integrity by comparing with the prestored reference code based on the feedback code 0010. A detailed operation regarding an integrity operation will be described in FIG. 20 and FIG. 21. Then, when integrity regarding the address setting operation performed in the first node apparatus 200-1 is identified, the electronic apparatus 100 may obtain the second address value #ad02 by inputting the first address value #ad01 in the address value area into the address value generating function. Then, the electronic apparatus 100 may store the second address value #ad02 in the address value area. The electronic apparatus 100 may generate an Ethernet frame 1530 including the second address value #ad02 and the feedback code 0010. Then, the electronic apparatus 100 may transmit the Ethernet frame 1530 to the first node apparatus 200-1.

The first node apparatus 200-1 may transmit the Ethernet frame 1530 received from the electronic apparatus 100 to the second node apparatus 200-2.

The second node apparatus 200-2 may receive the Ethernet frame 1530 from the first node apparatus 200-1.

An address setting operation may be performed according to various methods.

According to an address setting operation according to an embodiment, the second node apparatus 200-2 may obtain an address code 1 based on the address code area included in the Ethernet frame 1530. Then, the second node apparatus 200-2 may perform an operation corresponding to the address code 1 (the address setting operation). The second node apparatus 200-2 may set the second address value #ad02 stored in the address value area as address information.

According to an address setting operation according to another embodiment, the first node apparatus 200-1 may perform an address setting operation based on a control instruction (address set) stored in the first data area.

Then, the second node apparatus 200-2 may update the feedback code based on the result regarding the address setting operation. The second node apparatus 200-2 may obtain a feedback code 0010 based on the Ethernet frame 1530 received from the first node apparatus 200-1. Then, the second node apparatus 200-2 may obtain a feedback code 0100 by inputting the feedback code 0010 into a predetermined function. The predetermined function may mean a function of which code value increases based on a predetermined operation. For example, the predetermined function may be a function of which code value increases as much as "2" if an address setting operation is performed normally. Then, the second node apparatus 200-2 may obtain a second feedback frame 1540 based on the feedback code 0100. Then, the second node apparatus 200-2 may transmit the second feedback frame 1540 to the electronic apparatus 100. The second node apparatus 200-2 may transmit the second feedback frame 1540 in a reverse direction (or a reverse route) to the electronic apparatus 100. For example, the second node apparatus 200-2 may transmit the second feedback frame 1540 to the first node apparatus 200-1, and the first node apparatus 200-1 may transmit the second feedback frame 1540 to the electronic apparatus 100 again. As a result, the second node apparatus 200-2 may transmit the second feedback frame 1540 to the electronic apparatus 100.

The electronic apparatus 100 may identify integrity regarding the address setting operations performed in the first node apparatus 200-1 and the second node apparatus 200-2 based on the second feedback frame 1540 received from the second node apparatus 200-2. The electronic apparatus 100 may obtain a feedback code 0100 included in the second feedback frame 1540. Then, the electronic apparatus 100 may identify integrity by comparing with the prestored reference code based on the feedback code 0100. A detailed operation regarding an integrity operation will be described in FIG. 20 and FIG. 21.

Figure 16:
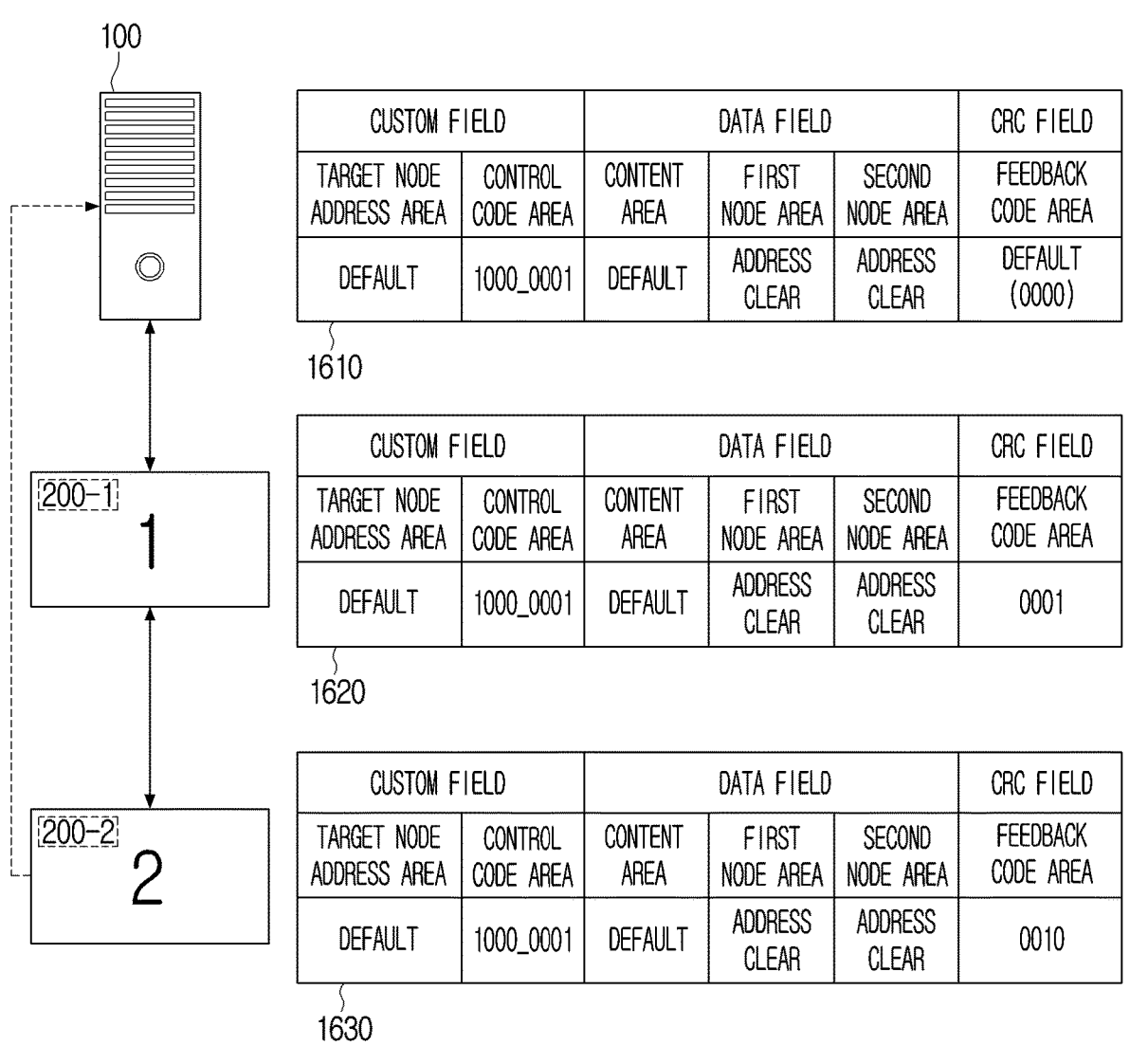
FIG. 16 is a diagram for illustrating an operation of initializing address values according to an embodiment.

FIG. 16 is a diagram for illustrating an operation of initializing address values according to a third embodiment.

Referring to FIG. 16, the electronic apparatus 100 may perform an operation of initializing an address value for each of the plurality of node apparatuses 200-1-200-*n* included in the node network 200. The electronic apparatus 100 may store an instruction for initializing the address information in the node area corresponding to each node apparatus. The node areas may be included in the data field of the Ethernet frame. Also, the plurality of node areas may mean areas corresponding to each of the plurality of node apparatuses 200-1-200-*n*. For example, the first node area may mean an area corresponding to the first node apparatus 200-1, and the second node area may mean an area corresponding to the second node apparatus 200-2. Detailed explanation regarding the node areas will be described in the embodiment 702 in FIG. 7.

The electronic apparatus 100 may store an instruction for initialization (address clear) for initializing the address information of the first node apparatus 200-1 in the first node area. Also, the electronic apparatus 100 may store an instruction for initialization (address clear) for initializing the address information of the second node apparatus 200-2 in the second node area. The electronic apparatus 100 may generate an Ethernet frame 1610 based on the first node area and the second node area wherein the instructions for initialization are stored. Also, the electronic apparatus 100 may store a feedback code 0000 in a feedback code area included in the CRC field. The feedback code 0000 may be a default value. The electronic apparatus 100 may transmit the Ethernet frame 1610 for setting of initialization to the first node apparatus 200-1.

The first node apparatus 200-1 may receive the Ethernet frame 1610 from the electronic apparatus 100. Then, the first node apparatus 200-1 may obtain a control instruction (address clear) based on the first node area included in the Ethernet frame 1610. Then, the first node apparatus 200-1 may perform an operation corresponding to the control instruction (address clear) (an initializing operation). Then, the first node apparatus 200-1 may update the feedback code based on the result regarding the initializing operation. The first node apparatus 200-1 may obtain a feedback code 0000 based on the Ethernet frame 1610 received from the electronic apparatus 100. Then, the first node apparatus 200-1 may obtain a feedback code 0001 by inputting the feedback code 0000 into a predetermined function. The predetermined function may mean a function of which code value increases based on a predetermined operation. For example, the predetermined function may be a function of which code value increases as much as "1" if an initializing operation is performed normally. Then, the first node apparatus 200-1 may obtain a first feedback frame 1620 based on the feedback code 0001. Then, the first node apparatus 200-1 may transmit the first feedback frame 1620 to the second node apparatus 200-2.

The second node apparatus 200-2 may receive the first feedback frame 1620 from the first node apparatus 200-1. Then, the second node apparatus 200-2 may obtain a control instruction (address clear) based on the second node area included in the first feedback frame 1620. Then, the second node apparatus 200-2 may perform an operation corresponding to the control instruction (address clear) (an initializing operation). Then, the second node apparatus 200-2 may update the feedback code based on the result regarding the initializing operation. The second node apparatus 200-2 may obtain a feedback code 0001 based on the first feedback frame 1620 received from the first node apparatus 200-1. Then, the second node apparatus 200-2 may obtain a feedback code 0010 by inputting the feedback code 0001 into a predetermined function. The predetermined function may mean a function of which code value increases based on a predetermined operation. For example, the predetermined function may be a function of which code value increases as much as "1" if an initializing operation is performed normally. Then, the second node apparatus 200-2 may obtain a second feedback frame 1630 based on the feedback code 0010. Then, the second node apparatus 200-2 may transmit the second feedback frame 1630 to the electronic apparatus 100. The second node apparatus 200-2 may transmit the second feedback frame 1630 in a reverse direction (or a reverse route) to the electronic apparatus 100. For example, the second node apparatus 200-2 may transmit the second feedback frame 1630 to the first node apparatus 200-1, and the first node apparatus 200-1 may transmit the second feedback frame 1630 to the electronic apparatus 100 again. As a result, the second node apparatus 200-2 may transmit the second feedback frame 1630 to the electronic apparatus 100.

The electronic apparatus 100 may identify integrity regarding the initializing operations performed in the first node apparatus 200-1 and the second node apparatus 200-2 based on the second feedback frame 1630 received from the second node apparatus 200-2. The electronic apparatus 100 may obtain a feedback code 0010 included in the second feedback frame 1630. Then, the electronic apparatus 100 may identify integrity by comparing with the prestored reference code based on the feedback code 0010. A detailed operation regarding an integrity operation will be described in FIG. 20 and FIG. 21.

Figure 17:
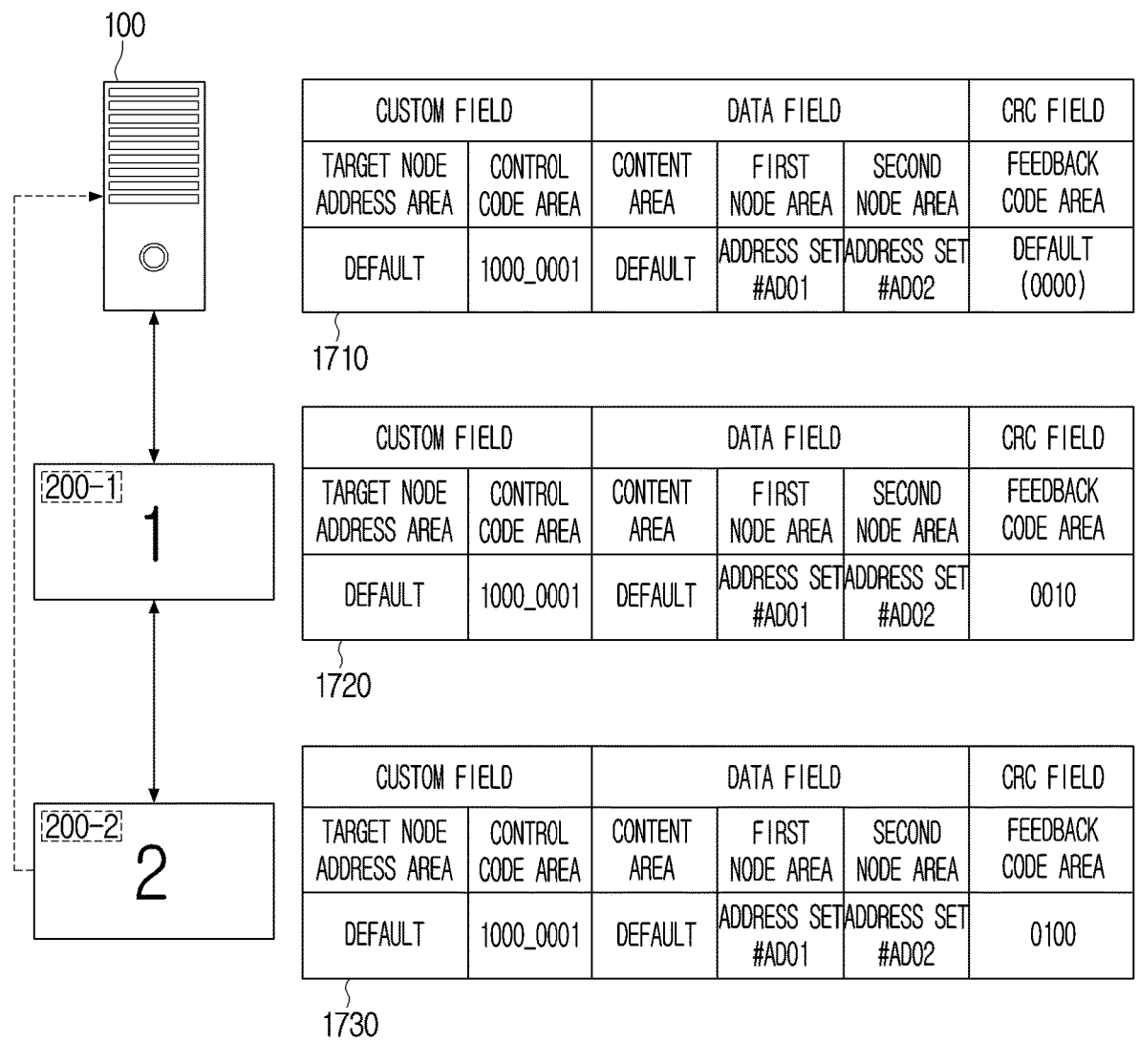
FIG. 17 is a diagram for illustrating an operation of setting address values according to an embodiment.

FIG. 17 is a diagram for illustrating an operation of setting address values according to a third embodiment.

Referring to FIG. 17, the electronic apparatus 100 may store address setting instructions and address values in node areas corresponding to each node apparatus. The node areas may be included in the data field of the Ethernet frame. Also, the plurality of node areas may mean areas corresponding to each of the plurality of node apparatuses 200-1-200-*n*. For example, the first node area may mean an area corresponding to the first node apparatus 200-1, and the second node area may mean an area corresponding to the second node apparatus 200-2. Detailed explanation regarding the node areas will be described in the embodiment 702 in FIG. 7.

The electronic apparatus 100 may obtain a first address value #ad01 by inputting a basic address value #ad00 into the address value generating function. Then, the electronic apparatus 100 may obtain a second address value #ad02 by inputting the first address value #ad01 into the address value generating function. Then, the electronic apparatus 100 may store the first address value #ad01 in the first node area, and store the second address value #ad02 in the second node area. Then, the electronic apparatus 100 may transmit the Ethernet frame 1710 including the first node area and the second node area to the first node apparatus 200-1.

The first node apparatus 200-1 may obtain the first address value #ad01 stored in the first node area based on the Ethernet frame 1710 received from the electronic apparatus 100. Then, the first node apparatus 200-1 may set the first address value #ad01 as the address information of the first node apparatus 200-1. Then, the first node apparatus 200-1 may update the feedback code based on the result regarding the address setting operation. The first node apparatus 200-1 may obtain a feedback code 0000 based on the Ethernet frame 1710 received from the electronic apparatus 100. Then, the first node apparatus 200-1 may obtain a feedback code 0010 by inputting the feedback code 0000 into a predetermined function. The predetermined function may mean a function of which code value increases based on a predetermined operation. For example, the predetermined function may be a function of which code value increases as much as "2" if an address setting operation is performed normally. Then, the first node apparatus 200-1 may obtain a first feedback frame 1720 based on the feedback code 0010. Then, the first node apparatus 200-1 may transmit the first feedback frame 1720 to the second node apparatus 200-2.

The second node apparatus 200-2 may obtain a second address value #ad02 stored in the second node area based on the first feedback frame 1720 received from the first node apparatus 200-1. Then, the second node apparatus 200-2 may set the second address value #ad02 as the address information of the second node apparatus 200-2. Then, the second node apparatus 200-2 may update the feedback code based on the result regarding the address setting operation. The second node apparatus 200-2 may obtain a feedback code 0010 based on the first feedback frame 1720 received from the first node apparatus 200-1. Then, the second node apparatus 200-2 may obtain a feedback code 0100 by inputting the feedback code 0010 into a predetermined function. The predetermined function may mean a function of which code value increases based on a predetermined operation. For example, the predetermined function may be a function of which code value increases as much as "2" if an address setting operation is performed normally. Then, the second node apparatus 200-2 may obtain a second feedback frame 1730 based on the feedback code 0100. Then, the second node apparatus 200-2 may transmit the second feedback frame 1730 to the electronic apparatus 100. The second node apparatus 200-2 may transmit the second feedback frame 1730 in a reverse direction (or a reverse route) to the electronic apparatus 100. For example, the second node apparatus 200-2 may transmit the second feedback frame 1730 to the first node apparatus 200-1, and the first node apparatus 200-1 may transmit the second feedback frame 1730 to the electronic apparatus 100 again. As a result, the second node apparatus 200-2 may transmit the second feedback frame 1730 to the electronic apparatus 100.

The electronic apparatus 100 may identify integrity regarding the address setting operations performed in the first node apparatus 200-1 and the second node apparatus 200-2 based on the second feedback frame 1730 received from the second node apparatus 200-2. The electronic apparatus 100 may obtain a feedback code 0100 included in the second feedback frame 1730. Then, the electronic apparatus 100 may identify integrity by comparing with the prestored reference code based on the feedback code 0100. A detailed operation regarding an integrity operation will be described in FIG. 20 and FIG. 21.

Figure 18:
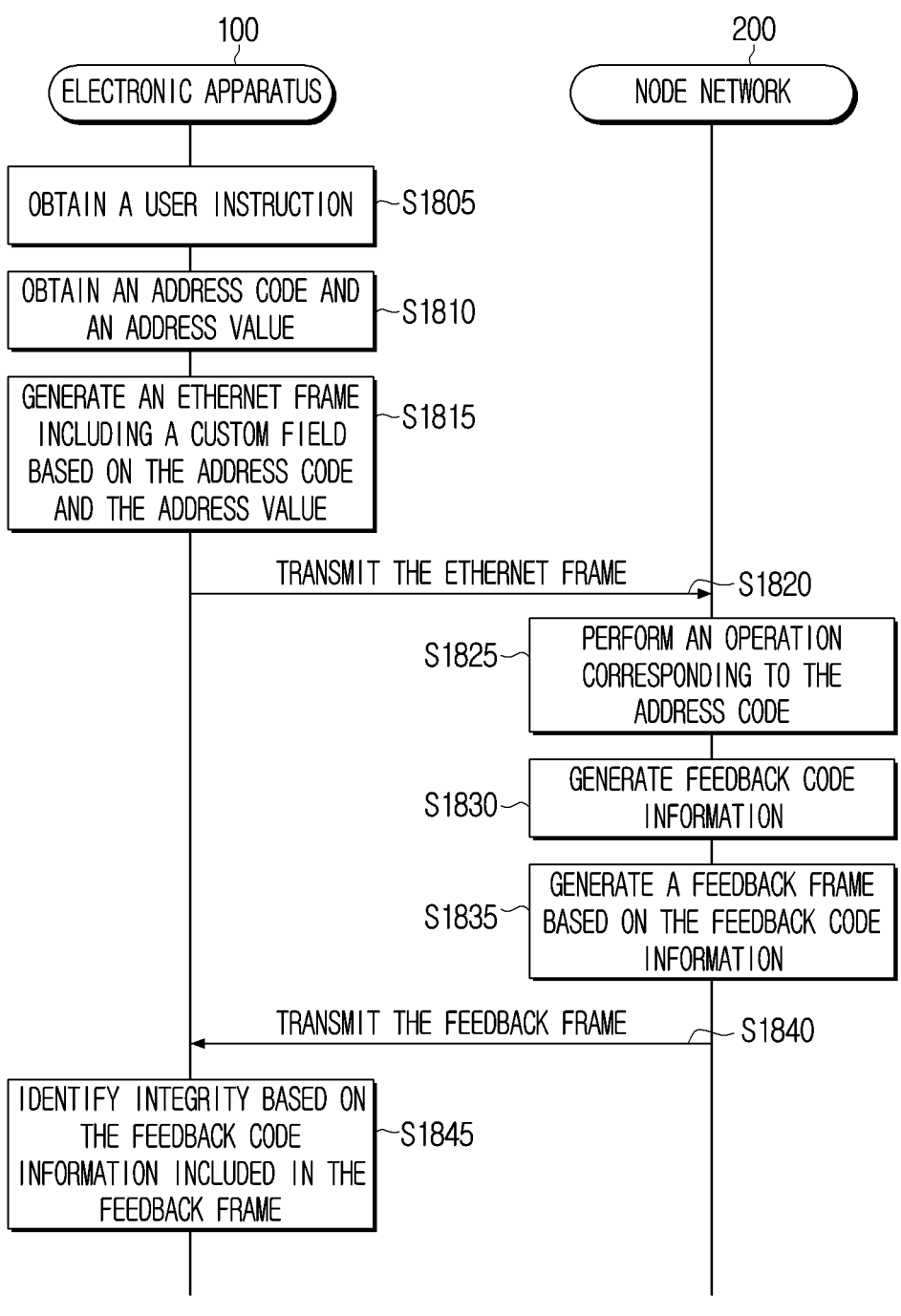
FIG. 18 is a flow chart for illustrating a process wherein a plurality of node apparatuses perform operations according to an address control code according to an embodiment.

FIG. 18 is a flow chart for illustrating a process wherein the plurality of node apparatuses 200-1-200-*n* perform operations according to an address control code.

Referring to FIG. 18, the electronic apparatus 100 may obtain a user instruction in operation S1805. Then, the electronic apparatus 100 may obtain an address code and an address value in operation S1810. Then, the electronic apparatus 100 may generate an Ethernet frame including a custom field based on the address code and the address value in operation S1815. Then, the electronic apparatus 100 may transmit the Ethernet frame to the node network 200 in operation S1820.

The node network 200 may perform an operation corresponding to the address code based on the Ethernet frame received from the electronic apparatus 100 in operation S1825. Then, the node network 200 may generate feedback code information in operation S1830. Then, the node network 200 may generate a feedback frame based on the feedback code in operation S1835. Then, the node network 200 may transmit the feedback frame to the electronic apparatus 100 in operation S1840.

The electronic apparatus 100 may receive the feedback frame from the node network 200. Then, the electronic apparatus 100 may identify integrity regarding the result of the operation performed in the node network 200 based on the feedback code information included in the feedback frame in operation S1845.

Figure 19:
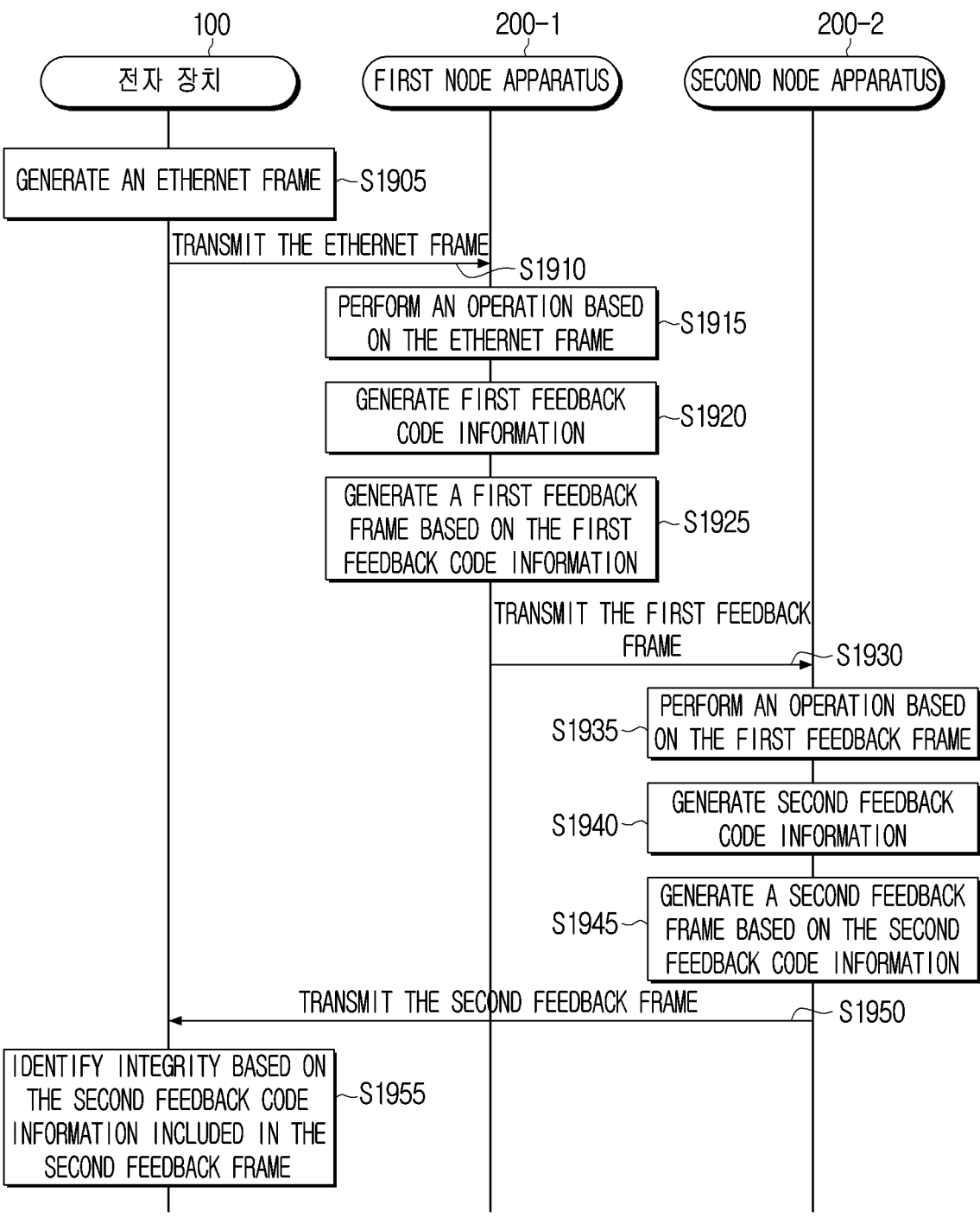
FIG. 19 is a flow chart for illustrating a process wherein operations corresponding to an address control code are performed in a first node apparatus and a second node apparatus according to an embodiment.

FIG. 19 is a flow chart for illustrating a process wherein operations corresponding to an address control code are performed in the first node apparatus 200-1 and the second node apparatus 200-2.

Referring to FIG. 19, the electronic apparatus 100 may generate an Ethernet frame in operation S1905. Then, the electronic apparatus 100 may transmit the Ethernet frame to the first node apparatus 200-1 in operation S1910.

The first node apparatus 200-1 may perform an operation related to address information based on the Ethernet frame received from the electronic apparatus 100 in operation S1915. The operation related to the address information may mean an operation of initializing the address information or an operation of setting the address information as a specific address value. Then, the first node apparatus 200-1 may generate first feedback code information based on the result of the performed operation in operation S1920. Then, the first node apparatus 200-1 may generate a first feedback frame based on the first feedback code information in operation S1925. Then, the first node apparatus 200-1 may transmit the first feedback frame to the second node apparatus 200-2 in operation S1930.

The second node apparatus 200-2 may perform an operation related to the address information based on the first feedback frame received from the first node apparatus 200-1 in operation S1935. The operation related to the address information may mean an operation of initializing the address information or an operation of setting the address information as a specific address value. Then, the second node apparatus 200-2 may generate second feedback code information based on the result of the performed operation in operation S1940. The second node apparatus 200-2 may obtain the second feedback code information by updating the first feedback code information. The second node apparatus 200-2 may obtain the second feedback code information by inputting the first feedback code information into a predetermined function. Then, the second node apparatus 200-2 may generate a second feedback frame based on the second feedback code information in operation S1945. Then, the second node apparatus 200-2 may transmit the second feedback frame to the electronic apparatus 100 in operation S1950.

The electronic apparatus 100 may receive the second feedback frame from the second node apparatus 200-2. Then, the electronic apparatus 100 may identify integrity regarding the result of the operations performed in the first node apparatus 200-1 and the second node apparatus 200-2 based on the second feedback code information included in the second feedback frame in operation S1955.

Figure 20:
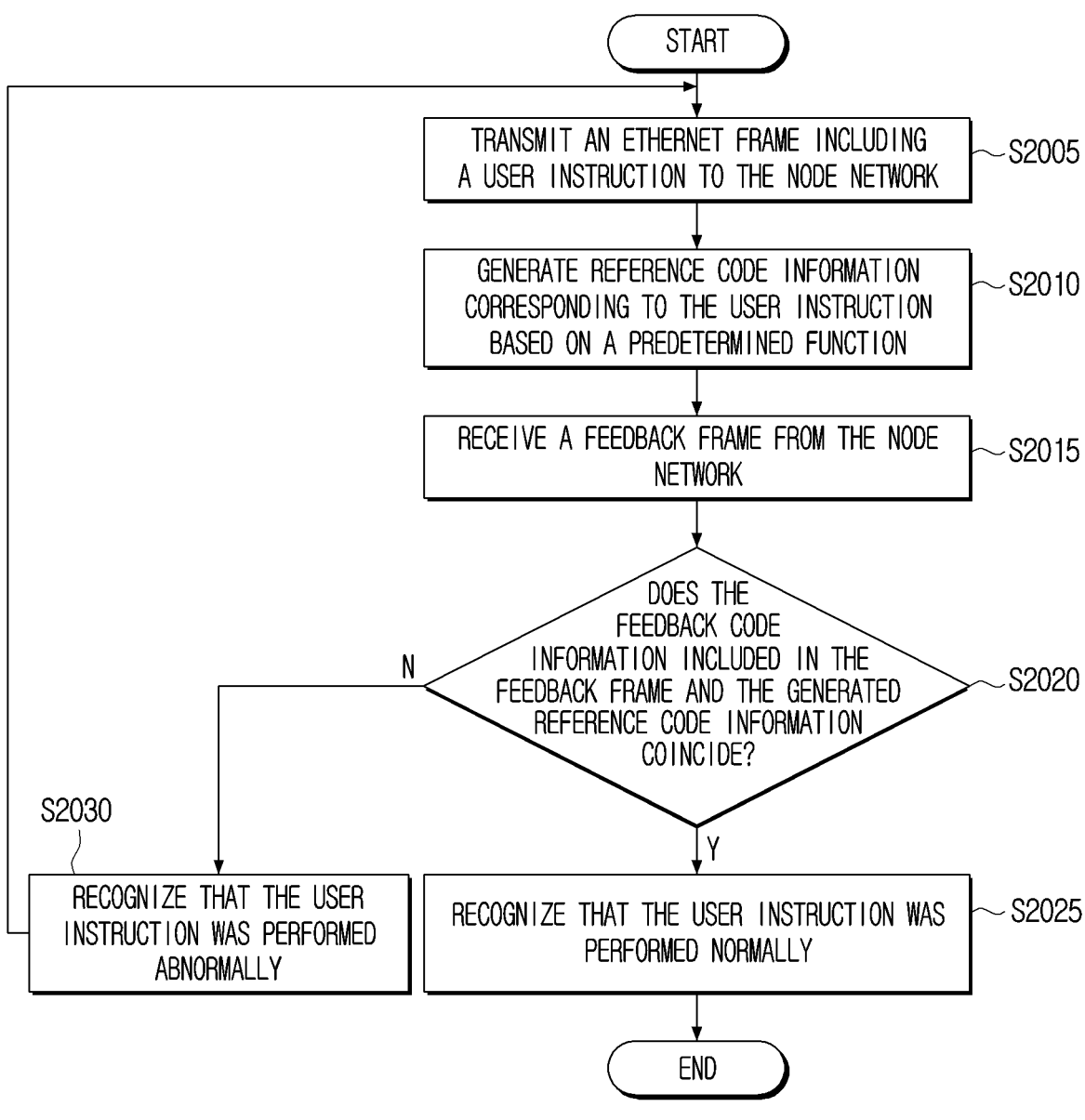
FIG. 20 is a flow chart for illustrating an operation of identifying whether a user instruction was performed normally based on a feedback frame according to an embodiment.

FIG. 20 is a flow chart for illustrating an operation of identifying whether a user instruction was performed normally based on a feedback frame.

Referring to FIG. 20, the electronic apparatus 100 may transmit an Ethernet frame including a user instruction to the node network 200 in operation S2005. Then, the electronic apparatus 100 may generate reference code information corresponding to the user instruction based on a predetermined function in operation S2010. Then, the electronic apparatus 100 may receive a feedback frame from the node network 200 in operation S2015. Then, the electronic apparatus 100 may obtain feedback code information included in the feedback frame. Then, the electronic apparatus 100 may determine whether the feedback code information included in the feedback frame and the reference code information generated in the operation S2010 coincide in operation S2020.

If the feedback code information coincides with the reference code information in operation S2020-Y, the electronic apparatus 100 may recognize that the user instruction was performed normally in the node network 200 in operation S2025. If the feedback code information does not coincide with the reference code information in operation S2020-N, the electronic apparatus 100 may recognize that the user instruction was performed abnormally in operation S2030.

Figure 21:
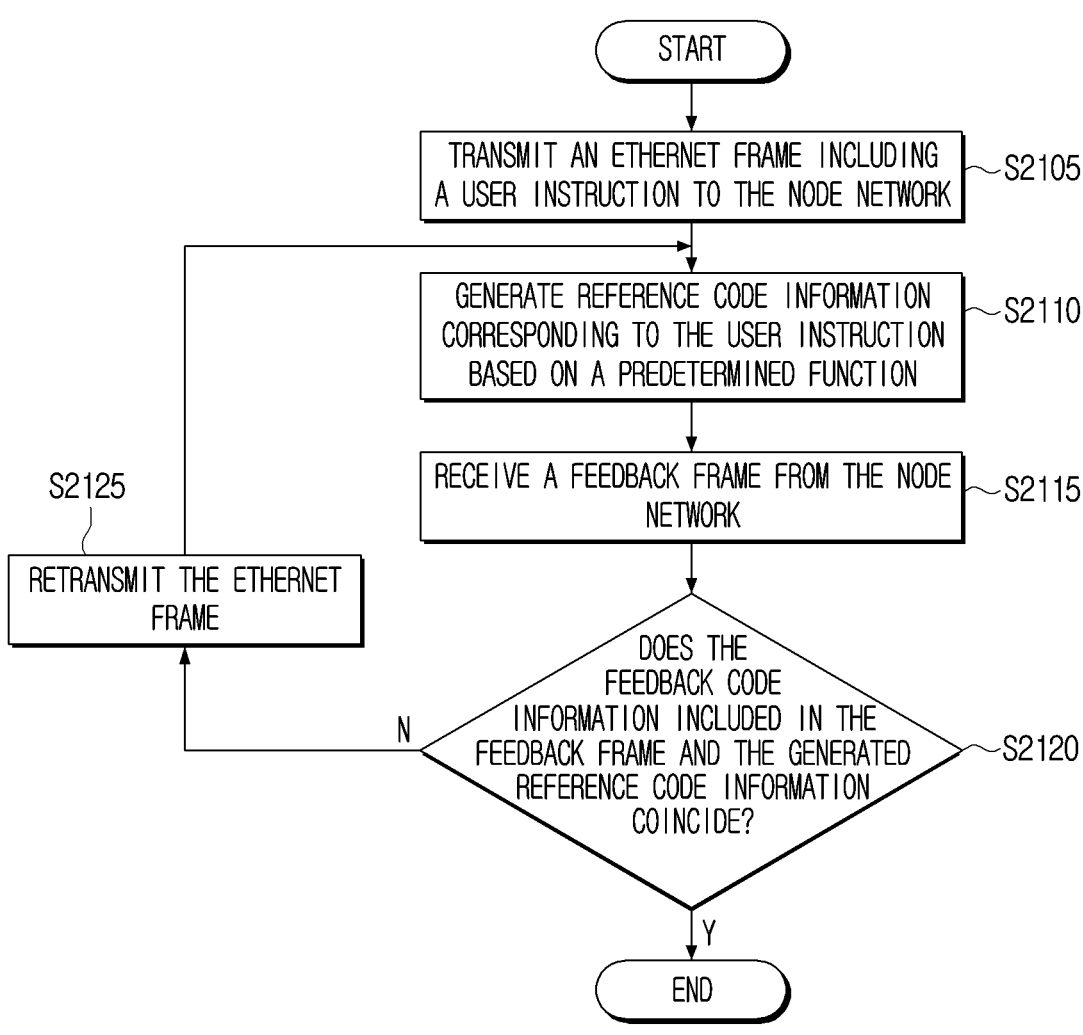
FIG. 21 is a flow chart for illustrating an operation of an electronic apparatus performed based on a result of identifying integrity according to an embodiment.

FIG. 21 is a flow chart for illustrating an operation of the electronic apparatus 100 performed based on a result of identifying integrity.

Referring to FIG. 21, the operations S2105, S2110, S2115, and S2120 may correspond to the operations S2005, S2010, S2015, and S2020 in FIG. 20, and thus overlapping explanation will be omitted.

If the feedback code information coincides with the reference code information in operation S2120-Y, the electronic apparatus 100 may identify integrity and end the address setting operation. If the feedback code information does not coincide with the reference code information in operation S2120-N, the electronic apparatus 100 may retransmit the Ethernet frame to the node network 200 in operation S2125. Then, the electronic apparatus 100 may repeat the operations S2110, S2115, and S2120.

Figure 22:
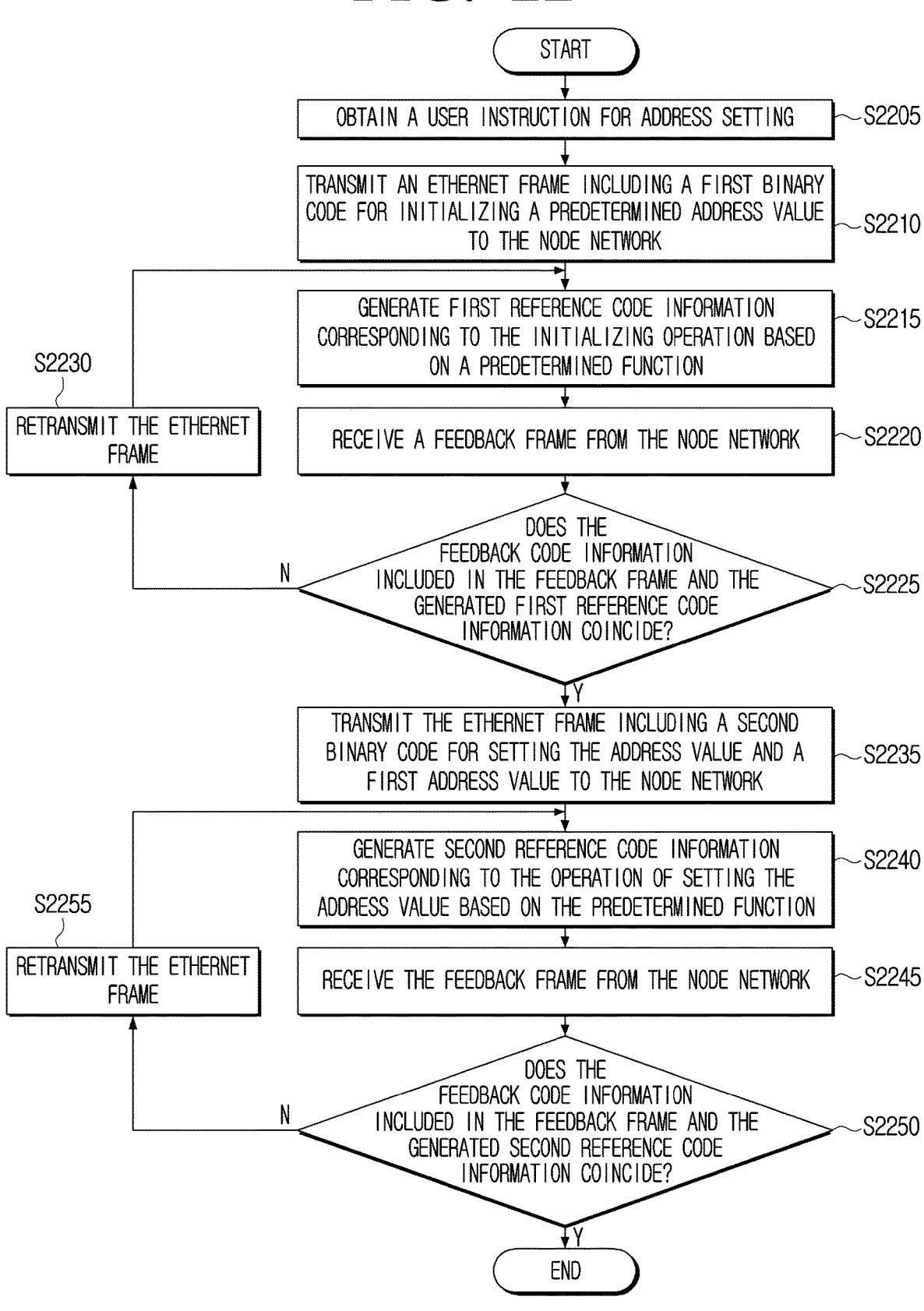
FIG. 22 is a flow chart for illustrating an operation of identifying integrity for each of an initializing operation and an address setting operation according to an embodiment.

FIG. 22 is a flow chart for illustrating an operation of identifying integrity for each of an initializing operation and an address setting operation.

Referring to FIG. 22, the electronic apparatus 100 may obtain a user instruction for address setting in operation S2205. Then, the electronic apparatus 100 may transmit an Ethernet frame including a first binary code for initializing a predetermined address value to the node network 200 in operation S2210. Then, the electronic apparatus 100 may generate first reference code information corresponding to an initializing operation based on a predetermined function in operation S2215. Then, the electronic apparatus 100 may receive a feedback frame from the node network 200 in operation S2220. Then, the electronic apparatus 100 may determine whether feedback code information included in the feedback frame and the first reference code information generated in the operation S2215 coincide in operation S2225.

If the feedback code information and the first reference code information do not coincide in operation S2225-N, the electronic apparatus 100 may retransmit the Ethernet frame to the node network 200 in operation S2230. Then, the electronic apparatus 100 may repeat the operations S2215, S2220, and S2225.

If the feedback code information and the first reference code information coincide in operation S2225-Y, the electronic apparatus 100 may transmit a second binary code for setting the address value and the Ethernet frame including the first address value to the node network 200 in operation S2235. Then, the electronic apparatus 100 may generate second reference code information corresponding to the operation of setting the address value based on the predetermined function in operation S2240. Then, the electronic apparatus 100 may receive the feedback frame from the node network 200 in operation S2245. Then, the electronic apparatus 100 may determine whether the feedback code information included in the feedback frame and the second reference code information generated in the operation S2240 coincide in operation S2250.

If the feedback code information and the first reference code information do not coincide in operation S2250-N, the electronic apparatus 100 may retransmit the Ethernet frame to the node network 200 in operation S2255. Then, the electronic apparatus 100 may repeat the operations S2240, S2245, and S2250.

If the feedback code information and the second reference code information coincide in operation S2250-Y, the electronic apparatus 100 may end the address setting operation.

Figure 23:
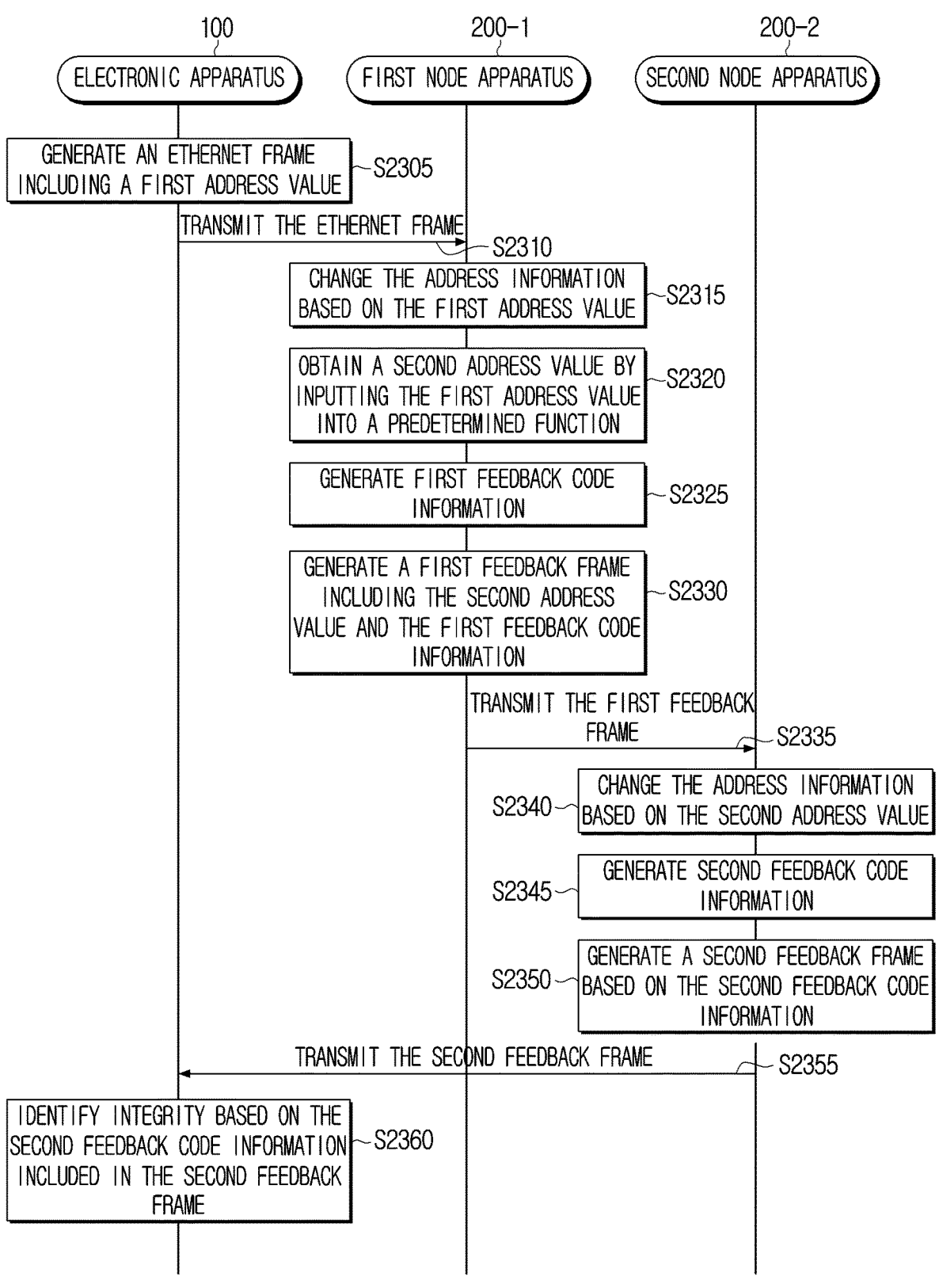
FIG. 23 is a flow chart for illustrating an operation of identifying integrity according to an embodiment.

FIG. 23 is a flow chart for illustrating an operation of identifying integrity according to a first embodiment.

Referring to FIG. 23, the electronic apparatus 100 may generate an Ethernet frame including a first address value in operation S2305. Then, the electronic apparatus 100 may transmit the Ethernet frame to the first node apparatus 200-1 in operation S2310.

The first node apparatus 200-1 may obtain a first address value from the Ethernet frame received from the electronic apparatus 100. Then, the first node apparatus 200-1 may change the address information based on the first address value in operation S2315. Then, the first node apparatus 200-1 may obtain a second address value by inputting the first address value into a predetermined function in operation S2320. The first node apparatus 200-1 may generate first feedback code information based on an address setting operation (an operation of changing the address information) in operation S2325. Then, the first node apparatus 200-1 may generate a first feedback frame including the second address value and the first feedback code information in operation S2330. Then, the first node apparatus 200-1 may transmit the first feedback frame to the second node apparatus 200-2 in operation S2335.

The second node apparatus 200-2 may obtain the second address value based on the first feedback frame received from the first node apparatus 200-1. Then, the second node apparatus 200-2 may change the address information based on the second address value in operation S2340. The second node apparatus 200-2 may generate second feedback code information based on an address setting operation (an operation of changing the address information) in operation S2345. The second node apparatus 200-2 may obtain the second feedback code information by updating the first feedback code information. The second node apparatus 200-2 may obtain the second feedback code information by inputting the first feedback code information into the predetermined function. Then, the second node apparatus 200-2 may generate a second feedback frame based on the second feedback code information in operation S2350. Then, the second node apparatus 200-2 may transmit the second feedback frame to the electronic apparatus 100 in operation S2355.

The electronic apparatus 100 may receive the second feedback frame from the second node apparatus 200-2. Then, the electronic apparatus 100 may identify integrity regarding the result of the operations performed in the first node apparatus 200-1 and the second node apparatus 200-2 based on the second feedback code information included in the second feedback frame in operation S2360.

Figure 24:
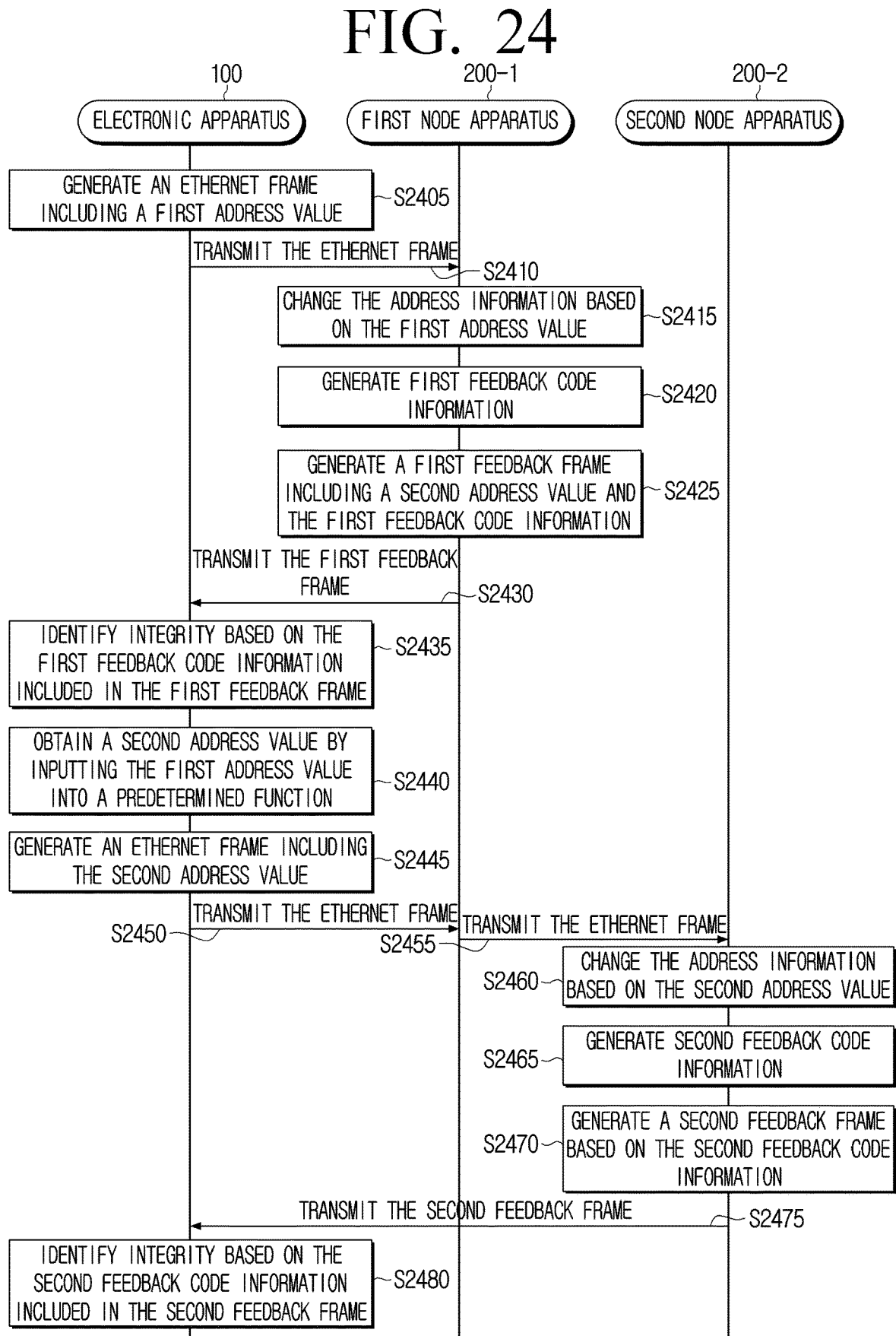
FIG. 24 is a flow chart for illustrating an operation of identifying integrity according to an embodiment.

FIG. 24 is a flow chart for illustrating an operation of identifying integrity according to a second embodiment.

Referring to FIG. 24, the electronic apparatus 100 may generate an Ethernet frame including a first address value in operation S2405. Then, the electronic apparatus 100 may transmit the Ethernet frame to the first node apparatus 200-1 in operation S2410.

The first node apparatus 200-1 may obtain the first address value from the Ethernet frame received from the electronic apparatus 100. Then, the first node apparatus 200-1 may change the address information based on the first address value in operation S2415. Then, the first node apparatus 200-1 may generate first feedback code information based on an address setting operation (an operation of changing the address information) in operation S2420. Then, the first node apparatus 200-1 may generate a first feedback frame including the first feedback code information in operation S2425. Then, the first node apparatus 200-1 may transmit the first feedback frame to the electronic apparatus 100 in operation S2430.

The electronic apparatus 100 may obtain the first feedback code information based on the first feedback frame received from the first node apparatus 200-1. Then, the electronic apparatus 100 may identify integrity regarding the result of the operation performed in the first node apparatus 200-1 based on the first feedback code information in operation S2435. Then, the electronic apparatus 100 may obtain a second address value by inputting the first address value into a predetermined function in operation S2440. Then, the electronic apparatus 100 may generate an Ethernet frame including the second address value in operation S2445. Then, the electronic apparatus 100 may transmit the Ethernet frame generated in the operation S2445 to the first node apparatus 200-1 in operation S2450.

The first node apparatus 200-1 may transmit the Ethernet frame received from the electronic apparatus 100 to the second node apparatus 200-2 again in operation S2455.

The second node apparatus 200-2 may obtain a second address value based on the first feedback frame received from the first node apparatus 200-1. Then, the second node apparatus 200-2 may change the address information based on the second address value in operation S2460. The second node apparatus 200-2 may generate second feedback code information based on an address setting operation (an operation of changing the address information) in operation S2465. The second node apparatus 200-2 may obtain the second feedback code information by updating the first feedback code information. The second node apparatus 200-2 may obtain the second feedback code information by inputting the first feedback code information into the predetermined function. Then, the second node apparatus 200-2 may generate a second feedback frame based on the second feedback code information in operation S2470. Then, the second node apparatus 200-2 may transmit the second feedback frame to the electronic apparatus 100 in operation S2475.

The electronic apparatus 100 may receive the second feedback frame from the second node apparatus 200-2. Then, the electronic apparatus 100 may identify integrity regarding the result of the operations performed in the first node apparatus 200-1 and the second node apparatus 200-2 based on the second feedback code information included in the second feedback frame in operation S2480.

Figure 25:
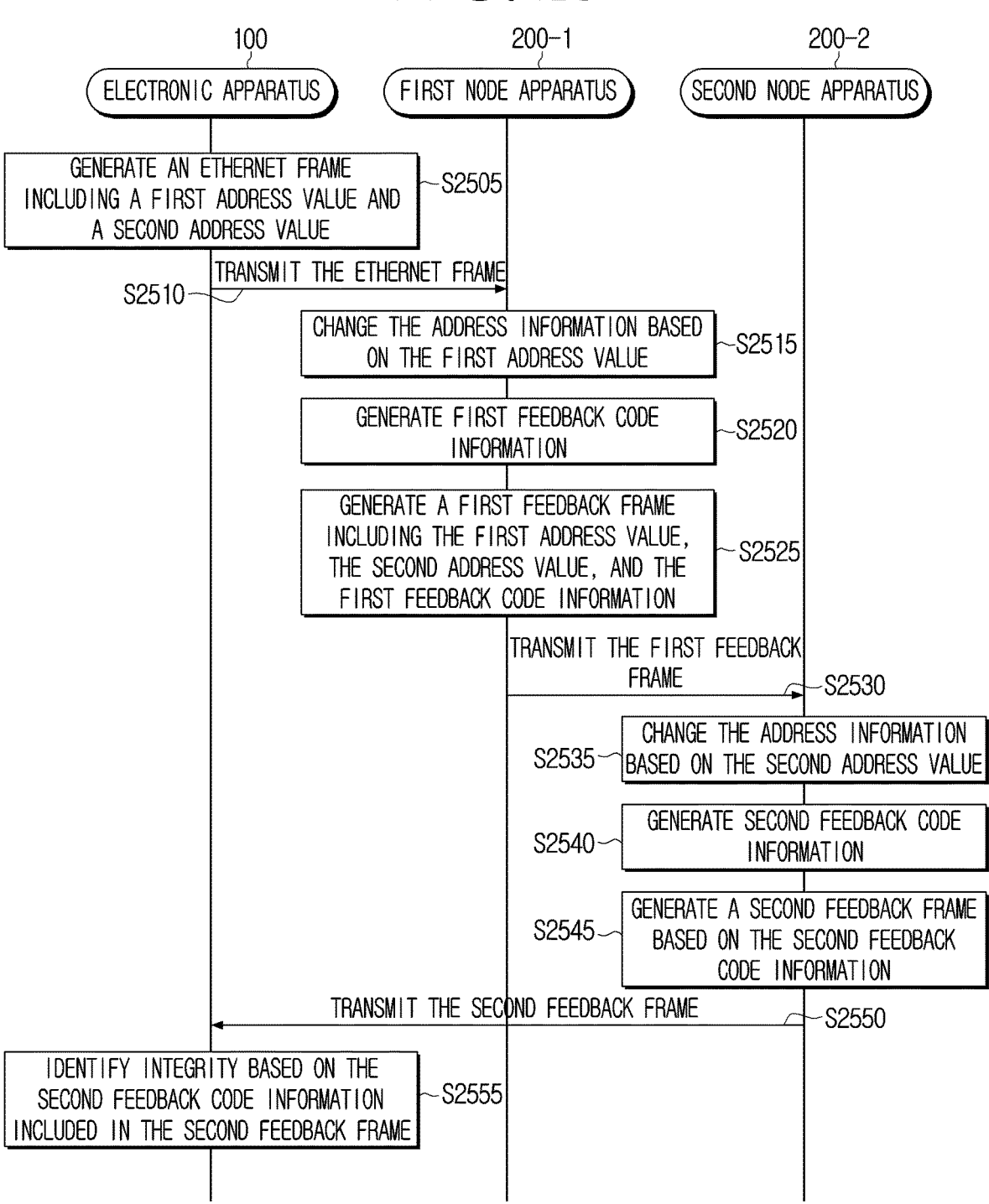
FIG. 25 is a flow chart for illustrating an operation of identifying integrity according to an embodiment.

FIG. 25 is a flow chart for illustrating an operation of identifying integrity according to a third embodiment.

Referring to FIG. 25, the electronic apparatus 100 may obtain a first address value and a second address value. Then, the electronic apparatus 100 may generate an Ethernet frame including the first address value and the second address value in operation S2505. Then, the electronic apparatus 100 may transmit the Ethernet frame to the first node apparatus 200-1 in operation S2510.

The first node apparatus 200-1 may obtain a first address value from the Ethernet frame received from the electronic apparatus 100. Then, the first node apparatus 200-1 may change the address information based on the first address value in operation S2515. Then, the first node apparatus 200-1 may generate first feedback code information based on an address setting operation (an operation of changing the address information) in operation S2520. Then, the first node apparatus 200-1 may generate a first feedback frame including the first address value, the second address value, and the first feedback code information in operation S2525. Then, the first node apparatus 200-1 may transmit the first feedback frame to the second node apparatus 200-2 in operation S2530.

The second node apparatus 200-2 may obtain the second address value based on the first feedback frame received from the first node apparatus 200-1. Then, the second node apparatus 200-2 may change the address information based on the second address value in operation S2535. The second node apparatus 200-2 may generate second feedback code information based on an address setting operation (an operation of changing the address information) in operation S2540. The second node apparatus 200-2 may obtain the second feedback code information by updating the first feedback code information. The second node apparatus 200-2 may obtain the second feedback code information by inputting the first feedback code information into a predetermined function. Then, the second node apparatus 200-2 may generate a second feedback frame based on the second feedback code information in operation S2545. Then, the second node apparatus 200-2 may transmit the second feedback frame to the electronic apparatus 100 in operation S2550.

The electronic apparatus 100 may receive the second feedback frame from the second node apparatus 200-2. Then, the electronic apparatus 100 may identify integrity regarding the result of the operations performed in the first node apparatus 200-1 and the second node apparatus 200-2 based on the second feedback code information included in the second feedback frame in operation S2555.

Figure 26:
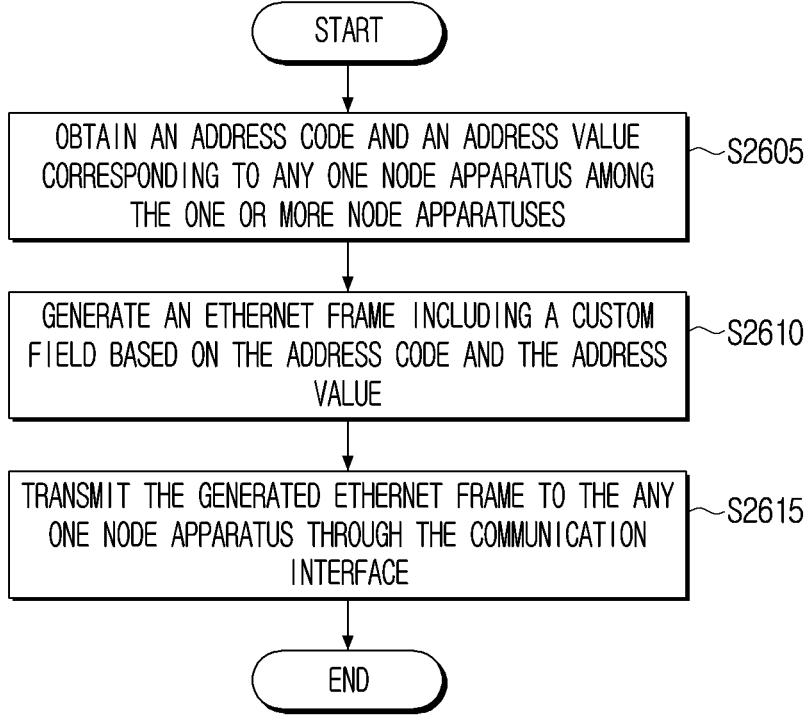
FIG. 26 is a flow chart for illustrating a control method for an electronic apparatus according to an embodiment.

FIG. 26 is a flow chart for illustrating a control method for the electronic apparatus 100 according to an embodiment of the disclosure.

Referring to FIG. 26, a control method for the electronic apparatus 100 that stores an address code, and communicates with one or more node apparatuses among a plurality of node apparatus connected by serial communication according to an embodiment of the disclosure may further include the steps of obtaining an address code and an address value corresponding to any one node apparatus among the one or more node apparatuses (S2605), generating an Ethernet frame including a custom field based on the address code and the address value (S2610), and transmitting the generated Ethernet frame to the any one node apparatus (S2615), wherein the custom field included in the Ethernet frame may include an address code area storing the address code and an address value area including the address value, and the address code may be a control code related to setting of the address value of the any one node apparatus.

The address code may include a first binary code of a first value or a second binary code of a second value, and the first value may be a control value for initializing a predetermined address value in the any one node apparatus, and the second value may be a control value for setting the address value of the any one node apparatus as the address value stored in the custom field.

In the operation S2605 of obtaining the address code and the address value, based on obtaining a user instruction for setting address values of the plurality of node apparatuses, the first binary code may be obtained based on the user instruction, and in the operation S2610 of generating the Ethernet frame, the first binary code may be stored in the address code area of the custom field, and the Ethernet frame may be generated based on the custom field.

In the operation S2605 of obtaining the address code and the address value, based on the address values of the plurality of node apparatuses being initialized, the second binary code and a first address value may be obtained, and in the operation S2610 of generating the Ethernet frame, the second binary code may be stored in the address code area of the custom field, the first address value may be stored in the address value area of the custom field, and the Ethernet frame may be generated based on the custom field.

The address value may be a value that is updated to an address value corresponding to each of the plurality of node apparatuses.

The address value may be a value that is updated in each of the plurality of node apparatuses.

The one or more node apparatuses may include a first node apparatus and a second node apparatus, and in the operation S2610 of generating the Ethernet frame, the Ethernet frame may be transmitted to the first node apparatus, and the control method may further include the step of, based on receiving a feedback frame from the second node apparatus, identifying integrity regarding a result of performing the user instruction based on the feedback frame.

The feedback frame may be a second feedback frame, and the second feedback frame may be generated in the second node apparatus based on a first feedback frame generated in the first node apparatus, and the first feedback frame may be a feedback frame for an operation performed in the first node apparatus based on the Ethernet frame, and the second feedback frame may be a feedback frame for an operation performed in the second node apparatus that received the first feedback frame from the first node apparatus.

In the operation of identifying integrity, reference code information corresponding to the user instruction may be obtained, and based on receiving the feedback frame, feedback code information included in the feedback frame may be obtained, and integrity regarding the result of performing the user instruction may be identified based on the obtained feedback code information and reference code information.

The control method may further include the steps of, based on the obtained feedback code information and reference code information not coinciding, obtaining address values corresponding to each of the plurality of node apparatuses, storing one address value among the address values corresponding to each of the plurality of node apparatuses in the address value area of the custom field, regenerating the Ethernet frame based on the custom field, and retransmitting the regenerated Ethernet frame to the first node apparatus.

The control method for an electronic apparatus as in FIG. 26 may be executed on an electronic apparatus having the configuration as in FIG. 2, and may also be executed on electronic apparatuses having other configurations.

Methods according to the aforementioned various embodiments of the disclosure may be implemented in forms of applications that can be installed on conventional electronic apparatuses.

Also, the methods according to the aforementioned various embodiments of the disclosure may be implemented just with software upgrade, or hardware upgrade of conventional electronic apparatuses.

Also, the methods according to the aforementioned various embodiments of the disclosure may be performed through an embedded server provided on an electronic apparatus, or an external server of at least one of an electronic apparatus or a display apparatus.

According to an embodiment of the disclosure, the aforementioned embodiments may be implemented as software including instructions stored in machine-readable storage media, which can be read by machines (e.g.: computers). The machines refer to apparatuses that call instructions stored in a storage medium, and can operate according to the called instructions, and the apparatuses may include an electronic apparatus according to the aforementioned embodiments. In case an instruction is executed by a processor, the processor may perform a function corresponding to the instruction by itself, or by using other components under its control. An instruction may include a code that is generated or executed by a compiler or an interpreter. A storage medium that is readable by machines may be provided in the form of a non-transitory storage medium. The term 'non-transitory' only means that a storage medium does not include signals, and is tangible, but does not indicate whether data is stored in the storage medium semi-permanently or temporarily.

Also, according to an embodiment of the disclosure, the methods according to the aforementioned embodiments may be provided while being included in a computer program product. A computer program product refers to a product, and it can be traded between a seller and a buyer. A computer program product can be distributed in the form of a storage medium that is readable by machines (e.g.: a compact disc read only memory (CD-ROM)), or distributed on-line through an application store (e.g.: Play Store™). In the case of on-line distribution, at least a portion of a computer program product may be stored in a storage medium such as the server of the manufacturer, the server of the application store, and the memory of the relay server at least temporarily, or may be generated temporarily.

In addition, each of the components (e.g.: a module or a program) according to the aforementioned embodiments may consist of a singular object or a plurality of objects. Further, among the aforementioned corresponding sub components, some sub components may be omitted, or other sub components may be further included in the various embodiments. Alternatively or additionally, some components (e.g.: a module or a program) may be integrated as an object, and perform functions that were performed by each of the components before integration identically or in a similar manner. Operations performed by a module, a program, or other components according to the various embodiments may be executed sequentially, in parallel, repetitively, or heuristically. Or, at least some of the operations may be executed in a different order or omitted, or other operations may be added.

The above-described embodiments are merely specific examples to describe technical content according to the embodiments of the disclosure and help the understanding of the embodiments of the disclosure, not intended to limit the scope of the embodiments of the disclosure. Accordingly, the scope of various embodiments of the disclosure should be interpreted as encompassing all modifications or variations derived based on the technical spirit of various embodiments of the disclosure in addition to the embodiments disclosed herein.

What is claimed is:

1. An electronic apparatus comprising:
a memory configured to store an address code;
a communication interface configured to communicate with one or more node apparatuses among a plurality of node apparatuses by serial communication; and
a processor configured to:
  generate, based on a user instruction, an address code and an initial address value for setting an address value of one node apparatus among the one or more node apparatuses;
  generate an Ethernet frame comprising a custom field; and
  transmit the generated Ethernet frame to the one node apparatus through the communication interface,
wherein the custom field comprises:
  an address code area storing the address code and an address value area storing the address value of the one node apparatus among the one or more node apparatuses,
wherein the address code comprises a first binary code of a first value, or a second binary code of a second value,
wherein the first value is configured to initialize the address value in the one node apparatus by setting the address value in the one node apparatus to a default address value, and wherein the second value is configured to set the address value of the one node apparatus based on the address value stored in the custom field.

2. The electronic apparatus of claim 1,
wherein the processor is further configured to:
based on obtaining a user instruction for setting address values of the plurality of node apparatuses, generate the first binary code; and
store the first binary code in the address code area of the custom field.

3. The electronic apparatus of claim 1,
wherein the processor is further configured to:
based on receiving feedback code information indicating that the address values of the plurality of node apparatuses have been initialized, generate a first address value from an address value generation function;
store the second binary code in the address code area of the custom field; and
store the first address value in the address value area of the custom field.

4. The electronic apparatus of claim 1,
wherein the address value is updated in each of the plurality of node apparatuses by inputting the address value of the custom field into an address value generation function.

5. The electronic apparatus of claim 1,
wherein the one or more node apparatuses comprises a first node apparatus and a second node apparatus,
wherein the processor is further configured to:
  transmit the Ethernet frame to the first node apparatus through the communication interface; and
  based on receiving a feedback frame from the second node apparatus, identify whether a performed user instruction was completed normally based on the feedback frame, and
wherein the feedback frame comprises feedback code information generated by the one or more node apparatuses based on an operation performed in the one or more node apparatuses.

6. The electronic apparatus of claim 5,
wherein the feedback frame is a second feedback frame,
wherein the second feedback frame is generated in the second node apparatus based on a first feedback frame generated in the first node apparatus,
wherein the first feedback frame is based on an operation performed in the first node apparatus based on the Ethernet frame, and
wherein the second feedback frame is based on an operation performed in the second node apparatus that received the first feedback frame from the first node apparatus.

7. The electronic apparatus of claim 5,
wherein the processor is further configured to:
obtain reference code information corresponding to the user instruction based on information stored in the memory;
based on receiving the feedback frame through the communication interface, obtain the feedback code information included in the feedback frame; and
identify whether the user instruction was performed normally based on the feedback code information and the reference code information.

8. The electronic apparatus of claim 7, wherein the processor is further configured to:

based on whether the feedback code information and the reference code information coincide, obtain address values corresponding to each of the plurality of node apparatuses;

store one address value among the address values corresponding to each of the plurality of node apparatuses in the address value area of the custom field;

regenerate the Ethernet frame based on the custom field; and retransmit the regenerated Ethernet frame to the first node apparatus through the communication interface.

9. A control method for an electronic apparatus that stores an address code, and communicates with one or more node apparatuses among a plurality of node apparatuses by serial communication, the control method comprising:

generating, based on a user instruction, an address code and an initial address value for setting an address value of one node apparatus among the one or more node apparatuses;

generating an Ethernet frame including a custom field; and transmitting the generated Ethernet frame to the one node apparatus, wherein the custom field includes an address code area storing the address code and an address value area storing the address value of the one node apparatus among the one or more node apparatuses, and wherein the address code includes a first binary code of a first value or a second binary code of a second value, wherein the first value is configured to initialize the address value in the one node apparatus by setting the address value in the one node apparatus to a default address value, and wherein the second value is configured to set the address value of the one node apparatus as the address value stored in the custom field.

10. The control method of claim 9, wherein the generating the address code and the address value comprises, based on obtaining a user instruction for setting address values of the plurality of node apparatuses, generating the first binary code based on the user instruction, and wherein the generating the Ethernet frame comprises:

generating the Ethernet frame including the custom field, and storing the first binary code in the address code area of the custom field.

11. The control method of claim 9, wherein the generating the address code and the address value comprises, based on receiving feedback information indicating that the address values of the plurality of node apparatuses have been initialized, generating a first address value, and wherein the generating the Ethernet frame comprises:

generating the Ethernet frame including the custom field, storing the second binary code in the address code area of the custom field, and storing the first address value in the address value area of the custom field.

12. The control method of claim 9, wherein the address value is updated in each of the plurality of node apparatuses by inputting the address value of the custom field into an address value generation function.

\* \* \* \* \*